(12) United States Patent
Baker

(10) Patent No.: US 11,602,788 B2
(45) Date of Patent: Mar. 14, 2023

(54) DISSOLVABLE COMPOSITIONS AND TOOLS INCLUDING PARTICLES HAVING A REACTIVE SHELL AND A NON-REACTIVE CORE

(71) Applicant: Dean Baker, Cypress, TX (US)

(72) Inventor: Dean Baker, Cypress, TX (US)

( * ) Notice: Subject to any disclaimer, the term of this patent is extended or adjusted under 35 U.S.C. 154(b) by 75 days.

(21) Appl. No.: 16/404,143

(22) Filed: May 6, 2019

(65) Prior Publication Data
US 2019/0337052 A1 Nov. 7, 2019

Related U.S. Application Data

(60) Provisional application No. 62/667,275, filed on May 4, 2018.

(51) Int. Cl.
| | |
|---|---|
| *C22C 32/00* | (2006.01) |
| *C22C 29/00* | (2006.01) |
| *B33Y 80/00* | (2015.01) |
| *B22F 7/00* | (2006.01) |
| *B22F 3/10* | (2006.01) |
| *B22F 7/02* | (2006.01) |
| *B33Y 70/00* | (2020.01) |
| *B22F 1/17* | (2022.01) |
| *B33Y 40/10* | (2020.01) |

(Continued)

(52) U.S. Cl.
CPC ......... *B22F 7/008* (2013.01); *B22F 1/17* (2022.01); *B22F 3/1039* (2013.01); *B22F 7/02* (2013.01); *B33Y 40/10* (2020.01); *B33Y 70/00* (2014.12); *C22C 29/00* (2013.01); *C22C 32/00* (2013.01); *B22F 10/40* (2021.01); *B22F 2003/1042* (2013.01); *B22F 2003/1051* (2013.01); *B22F 2005/002* (2013.01); *B22F 2202/13* (2013.01); *B22F 2301/15* (2013.01); *B22F 2303/30* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| | | |
|---|---|---|
| 3,264,073 A | 8/1966 | Schmitt |
| 3,655,425 A | 4/1972 | Longo et al. |
| (Continued) | | |

OTHER PUBLICATIONS

AZO Materials, "Grade ZK61 Magnesium Alloy", https://www.azom.com/article.aspx?ArticleID=9967, accessed Dec. 2, 2020.*

(Continued)

*Primary Examiner* — Xiaobei Wang
(74) *Attorney, Agent, or Firm* — Alberto Q. Amatong, Jr.; Amatong McCoy LLC

(57) ABSTRACT

A core-shell particle is provided, including a core particle composed of a non-reactive component, and a coating layer disposed about the core particle, the coating layer composed of reactive component. The reactive component is chemically reactive with water, acid, or base, and the non-reactive component is non-reactive with water, acid, or base. Also provided are a bulk composition composed of the core-shell particle, an article composed of the bulk composition, as well as method and system of making and using the particles, composition, and articles.

19 Claims, 9 Drawing Sheets
(1 of 9 Drawing Sheet(s) Filed in Color)

(51) Int. Cl.
   *B22F 3/105*   (2006.01)
   *B22F 5/00*    (2006.01)
   *B33Y 10/00*   (2015.01)
   *B22F 10/40*   (2021.01)

(56) References Cited

U.S. PATENT DOCUMENTS

| | | | |
|---|---|---|---|
| 3,752,685 A | 8/1973 | Honda et al. | |
| 3,899,569 A * | 8/1975 | Hunter | C22B 34/1222 |
| | | | 423/79 |
| 4,303,732 A | 12/1981 | Torobin | |
| 4,450,184 A | 5/1984 | Longo et al. | |
| 4,453,081 A | 6/1984 | Christ et al. | |
| 4,624,865 A | 11/1986 | Gindrup et al. | |
| 4,939,038 A | 7/1990 | Inabata | |
| 5,070,591 A | 12/1991 | Quick et al. | |
| 5,271,749 A | 12/1993 | Rai et al. | |
| 5,601,924 A | 2/1997 | Beane et al. | |
| 5,786,785 A | 7/1998 | Gindrup et al. | |
| 5,892,476 A | 4/1999 | Gindrup et al. | |
| 5,965,829 A | 10/1999 | Haynes et al. | |
| 6,024,915 A | 2/2000 | Kume et al. | |
| 6,207,218 B1 | 3/2001 | Layrolle et al. | |
| 6,630,008 B1 | 10/2003 | Meeks et al. | |
| 6,656,587 B2 | 12/2003 | Johnson et al. | |
| 6,709,739 B1 | 3/2004 | Mullen et al. | |
| 6,733,503 B2 | 5/2004 | Layrolle et al. | |
| 6,752,938 B2 | 6/2004 | Wang et al. | |
| 6,831,223 B2 | 12/2004 | Kamata et al. | |
| 6,849,186 B2 | 2/2005 | Johnson et al. | |
| 6,852,272 B2 | 2/2005 | Artz et al. | |
| 6,854,172 B2 | 2/2005 | Kaese et al. | |
| 6,864,297 B2 | 3/2005 | Nutt et al. | |
| 6,919,063 B2 | 7/2005 | Jang et al. | |
| 7,498,077 B2 | 3/2009 | Joseph et al. | |
| 8,211,247 B2 | 7/2012 | Marya et al. | |
| 8,220,554 B2 | 7/2012 | Jordan et al. | |
| 8,342,094 B2 | 1/2013 | Marya et al. | |
| 8,353,604 B2 | 1/2013 | Glazier | |
| 8,409,289 B2 | 4/2013 | Truckai et al. | |
| 8,485,265 B2 | 7/2013 | Marya et al. | |
| 8,535,604 B1 | 9/2013 | Baker et al. | |
| 8,573,295 B2 | 11/2013 | Johnson et al. | |
| 8,663,401 B2 | 3/2014 | Marya et al. | |
| 8,677,903 B2 | 3/2014 | Marya et al. | |
| 8,770,261 B2 | 7/2014 | Marya | |
| 8,986,369 B2 | 3/2015 | Steckel et al. | |
| 9,068,429 B2 | 6/2015 | Mailand et al. | |
| 9,079,246 B2 | 7/2015 | Xu et al. | |
| 9,090,956 B2 | 7/2015 | Xu | |
| 9,109,429 B2 | 8/2015 | Xu et al. | |
| 9,127,515 B2 | 9/2015 | Xu et al. | |
| 9,333,099 B2 | 5/2016 | Pacetti et al. | |
| 9,353,010 B2 | 5/2016 | McEntire et al. | |
| 10,815,748 B1 * | 10/2020 | Meeks | B22F 3/02 |
| 2003/0180171 A1 | 9/2003 | Artz et al. | |
| 2005/0218729 A1 * | 10/2005 | Or | H01L 41/16 |
| | | | 310/26 |
| 2005/0260093 A1 | 11/2005 | Artz et al. | |
| 2006/0045787 A1 | 3/2006 | Jandeska et al. | |
| 2008/0249638 A1 | 10/2008 | Asgari | |
| 2009/0074604 A1 | 3/2009 | Chen et al. | |
| 2010/0294510 A1 | 11/2010 | Holmes | |
| 2011/0135530 A1 * | 6/2011 | Xu | B22F 3/172 |
| | | | 419/13 |
| 2011/0135953 A1 | 6/2011 | Xu et al. | |
| 2012/0103135 A1 | 5/2012 | Xu et al. | |
| 2013/0022832 A1 * | 1/2013 | Guest | B32B 15/01 |
| | | | 428/610 |
| 2013/0032357 A1 | 2/2013 | Mazyar et al. | |
| 2013/0098203 A1 | 4/2013 | Sherman et al. | |
| 2014/0004270 A1 | 1/2014 | Sherman et al. | |
| 2014/0202708 A1 | 7/2014 | Jacob et al. | |
| 2014/0228972 A1 * | 8/2014 | Xu | A61L 17/06 |
| | | | 623/23.75 |
| 2014/0251641 A1 | 9/2014 | Marya et al. | |
| 2014/0286810 A1 | 9/2014 | Marya | |
| 2014/0363693 A1 | 12/2014 | Tamiya | |
| 2015/0240337 A1 * | 8/2015 | Sherman | B22D 21/007 |
| | | | 420/408 |
| 2017/0072465 A1 | 3/2017 | Welch et al. | |
| 2017/0072471 A1 | 3/2017 | Welch et al. | |
| 2017/0198545 A1 * | 7/2017 | Jurgensmeier | E21B 29/02 |
| 2017/0239727 A1 * | 8/2017 | Oxford | B22F 7/08 |
| 2017/0281827 A1 | 10/2017 | Baker | |

OTHER PUBLICATIONS

Young et al., "Corrosion of aluminum nitride substrates in acid, alkaline solutions and water", 1995, J. of Mat. Sci., vol. 30, pp. 185-195. (Year: 1995).*
BBC, "Metals", 2021, <https://www.bbc.co.uk/bitesize/guides/zqwmxnb/revision/2>, accessed Sep. 21, 2021. (Year: 2021).*
Chemistry School, "Aluminum and Sodium Hydroxide Reaction", <https://www.chemistryscl.com/reactions/aluminum+NaOH%20reaction/index.php>, accessed Sep. 21, 2021.*
UMass Amherst, "Lecture Demonstrations", <https://lecturedemos.chem.umass.edu/equilibria15_3.html>, accessed Sep. 21, 2021.*
Aluminum, http://web.archive.org/web/20020603153546/ http://www.aluminyumsanayi.com/aluwebsayfam2.html, Jun. 3, 2002, 4 pages.
Materials Aluminum Oxide (Al2O3) Properties, May 20, 2006, http://web.archive.org/web/20060520195437/ http://accuratus.com/alumox.html, 3 pages.
Mordike et al, Magnesium Properties—applications—potential, 2001, Elsevier, Materials Science and Engineering A, vol. 302, pp. 37-45.

* cited by examiner

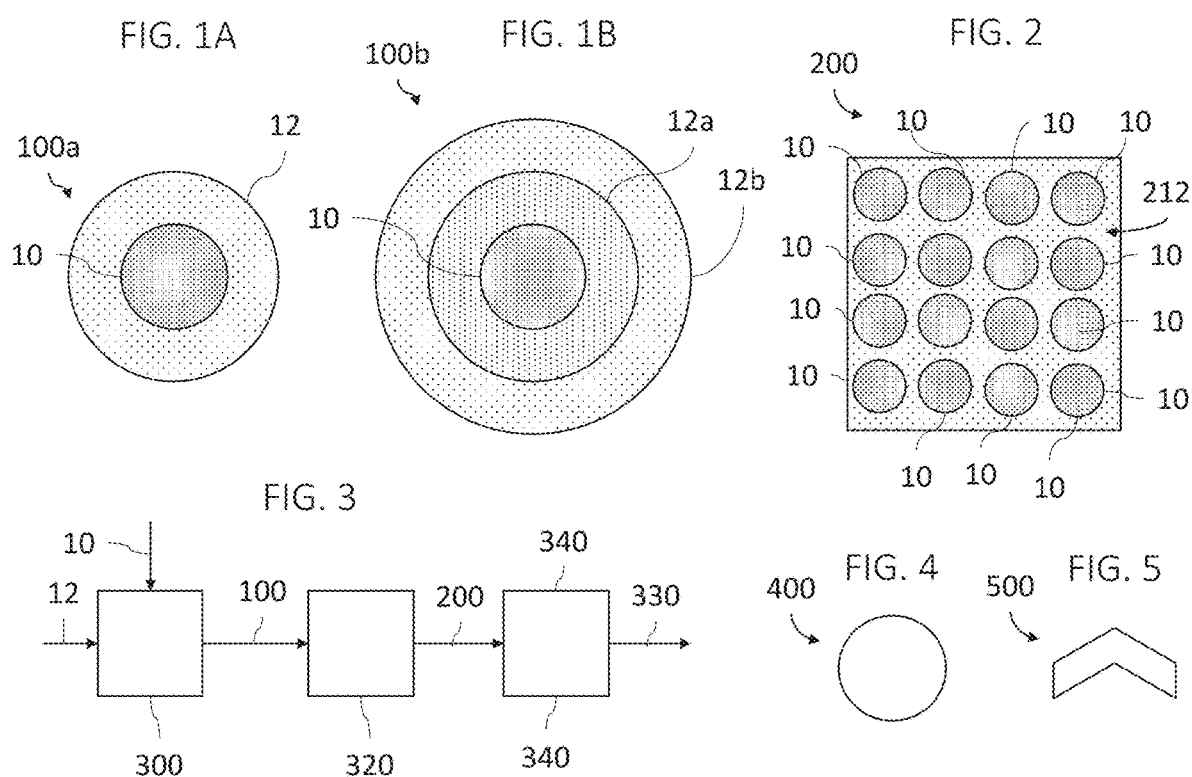

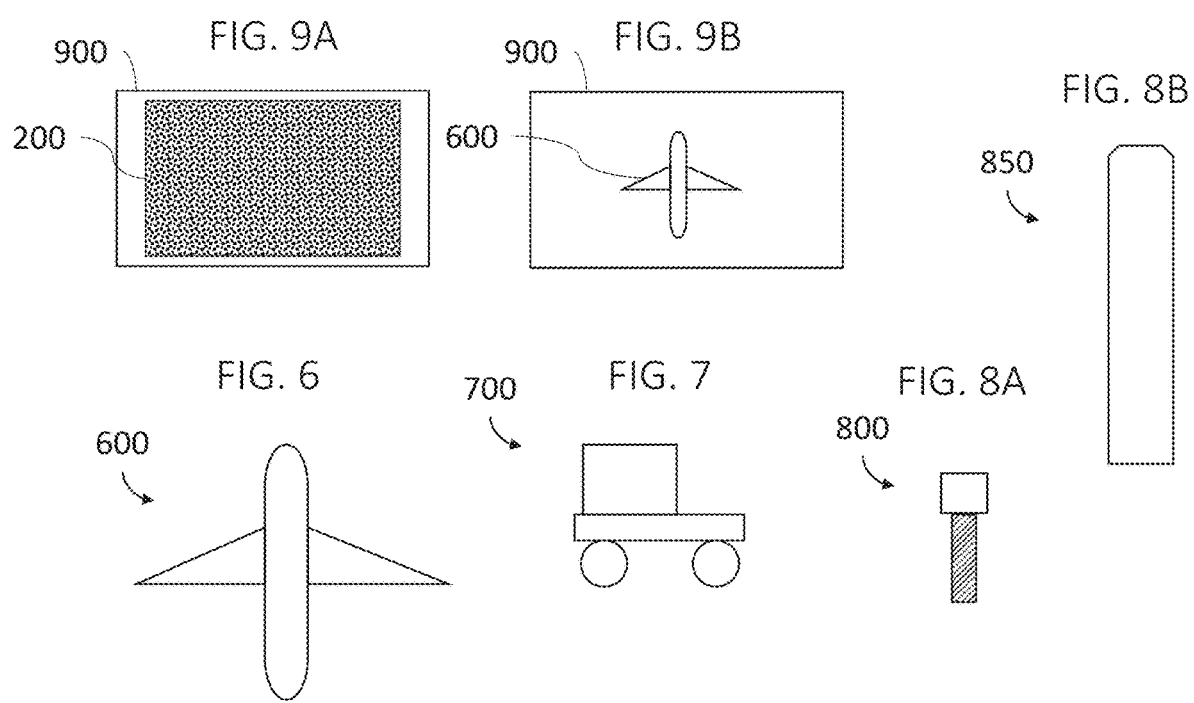

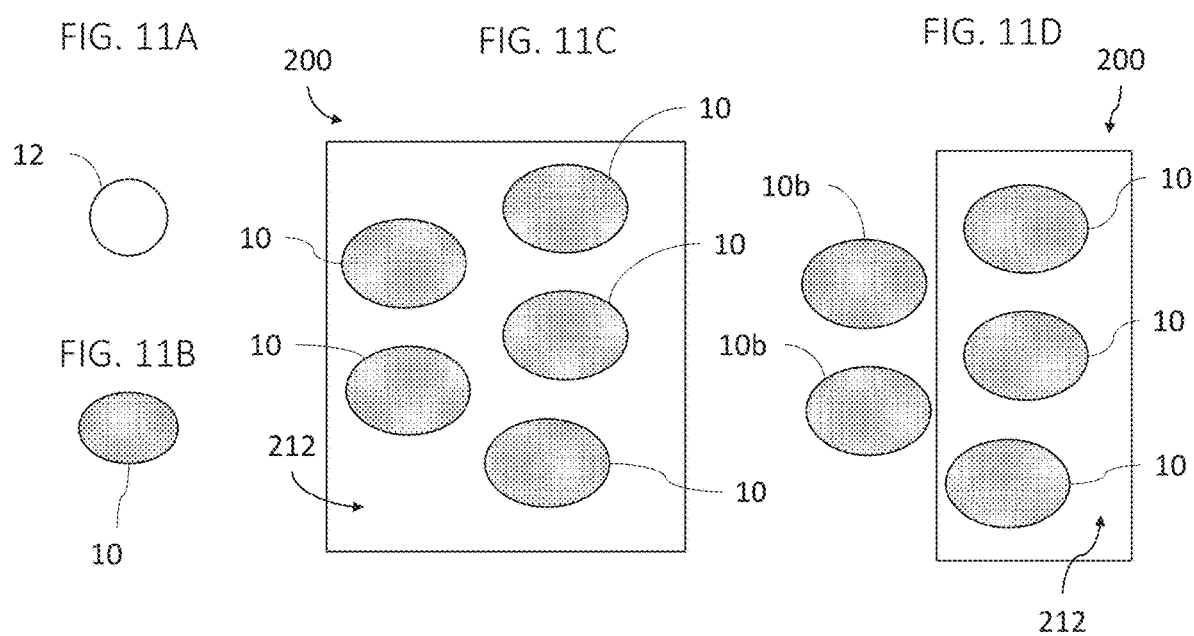

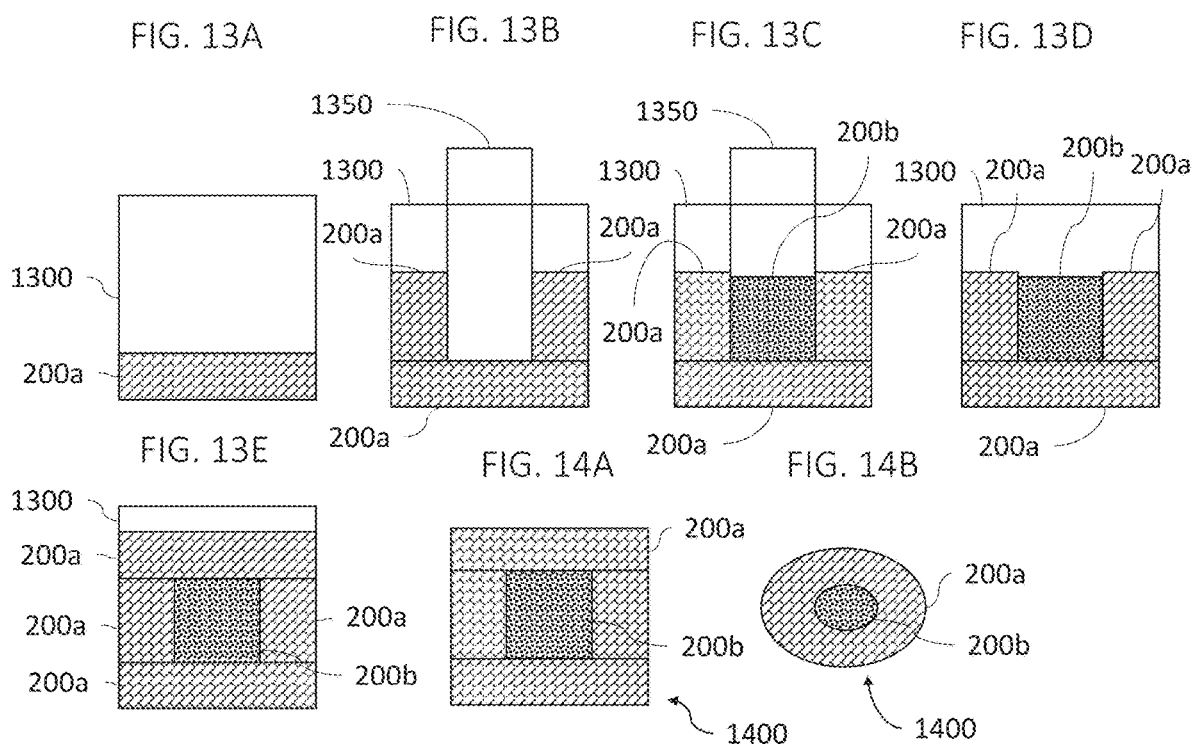

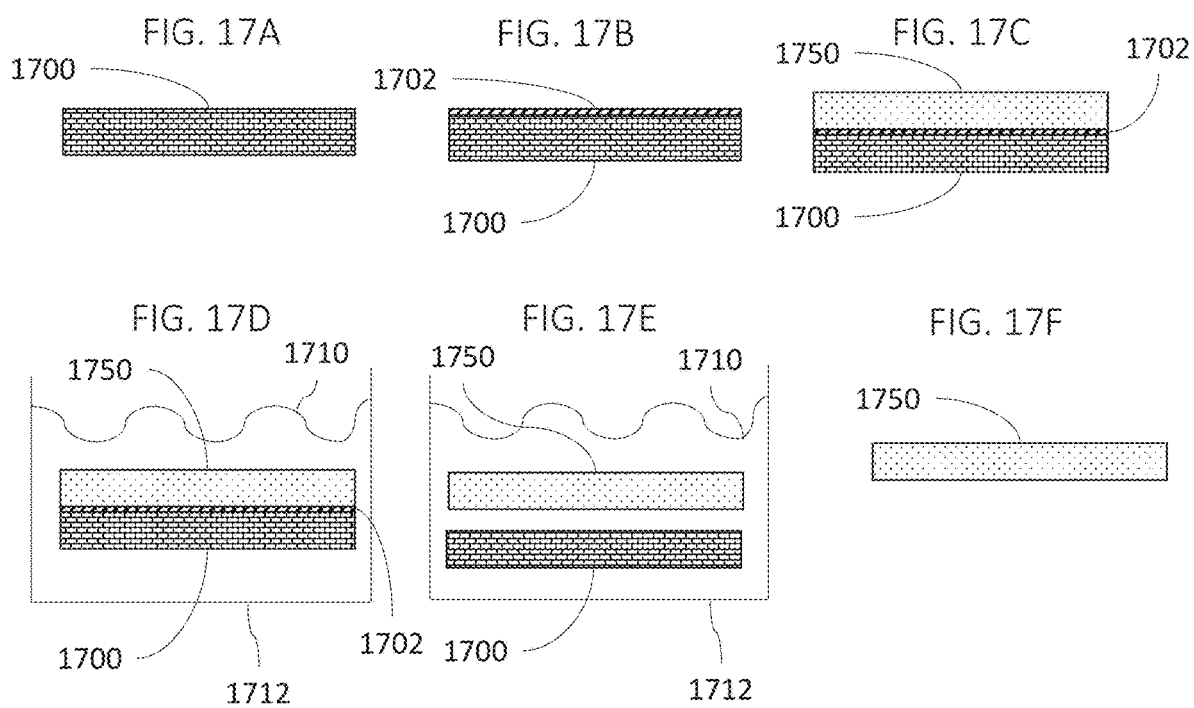

US 11,602,788 B2

DISSOLVABLE COMPOSITIONS AND TOOLS INCLUDING PARTICLES HAVING A REACTIVE SHELL AND A NON-REACTIVE CORE

CROSS-REFERENCE TO RELATED APPLICATIONS

The present application claims the benefit of U.S. Provisional Patent Application No. 62/667,275, filed on May 4, 2018, and entitled "DISSOLVABLE COMPOSITIONS AND TOOLS INCLUDING PARTICLES HAVING A REACTIVE SHELL AND A NON-REACTIVE CORE", the entirety of which is incorporated herein by reference.

FIELD

The present disclosure relates to dissolvable compositions and tools or other apparatus made therefrom, including the design and manufacture thereof. The present disclosure also relates to processes, systems, and apparatus for making and using such compositions, tools (e.g., oil and gas tools), parts, and other apparatus, as well as to applications thereof.

BACKGROUND

In certain applications (e.g., oil and gas applications) it is beneficial to use a tool or apparatus that is dissolvable or otherwise degradable, such as to avoid the necessity to retrieve the tool or apparatus after deployment and/or use (e.g., downhole intervention and associated costs), to reduce or eliminate the risk of others retrieving the tool or apparatus after use, and/or to increase the efficiency and effectiveness of an operation within which the tool or apparatus is used.

Often, materials composed entirely of dissolvable compositions (e.g., a single dissolvable composition) degrade too quickly for practical applications, such that tools made therefrom do not last for a time frame that is sufficient to perform a desired task or function. Some dissolvable compositions degrade too slowly for practical applications, such that tools made therefrom do not dissolve within a time frame that allows for removal of the tool from the environment (e.g., a dissolvable frac ball that lasts too long to allow a well to produce). The ability to incorporate non-reactive compositions (e.g., multiple non-reactive components) into such tools would be beneficial in certain applications.

Some materials composed entirely of dissolvable compositions may suffer from a lack of sufficient material strength. The ability to incorporate compositions into such tools that exhibit increased material strength would be beneficial in certain applications.

Often, degradable tools rely on galvanic reaction between materials to provide dissolvability. While galvanic reactions are useful in some applications, they have drawbacks in other applications, such as in low-electrolyte, freshwater conditions. The ability to incorporate other, non-galvanic reactions, or create sustainable galvanic reactions, for dissolution would be beneficial in certain circumstances.

BRIEF SUMMARY

One embodiment of the present disclosure includes a core-shell particle. The core-shell particle includes a core particle including a non-reactive component, and a layer disposed about the core particle, the layer including a reactive component. The reactive component is chemically reactive with water, acid, or base, and the non-reactive component is unreactive with water, acid, or base.

Another embodiment of the present disclosure includes a bulk composition having a multiphase morphology. The bulk composition includes a continuous phase of a matrix material that includes a reactive component, and a discontinuous phase including a plurality of particles of a non-reactive component. The plurality of particles are distributed within the matrix material. The reactive component is chemically reactive with water, acid, or base, and the non-reactive component is unreactive with water, acid, or base.

Another embodiment of the present disclosure includes an article of manufacture that includes a bulk composition having a multiphase morphology. The bulk composition incudes a continuous phase of a matrix material including a reactive component, and a discontinuous phase including a plurality of particles of a non-reactive component. The plurality of particles are distributed within the matrix material. The reactive component is chemically reactive with water, acid, or base, and the non-reactive component is unreactive with water, acid, or base.

Another embodiment of the present disclosure includes a method that includes depositing a reactive component onto a plurality of core particles of a non-reactive component. The deposited reactive component forms layers about the plurality of core particles, thereby forming a plurality of core-shell particles. The reactive component is chemically reactive with water, acid, or base, and the non-reactive component is unreactive with water, acid, or base.

Another embodiment of the present disclosure includes a method of using an article. The method includes providing an article that includes a bulk composition having a multiphase morphology. The bulk composition includes a continuous phase of a matrix material including a reactive component, and a discontinuous phase including a plurality of particles of a non-reactive component. The plurality of particles are distributed within the matrix material. The reactive component is chemically reactive with water, acid, or base, and the non-reactive component is unreactive with water, acid, or base. The method includes contacting the article with water, acid, or base. Upon or after contact with water, acid, or base, the reactive component reacts with the water, acid, or base.

Another embodiment includes a method of additive manufacturing an article. The method includes depositing a layer onto a build plate; additive manufacturing an article from a material onto the layer, such that the layer is positioned between the material and the build plate; after additive manufacturing of the article, contacting the layer with water until the layer dissolves, such that the article is separated from the build plate and the layer; and retrieving the article.

Another embodiment includes a substrate layer for positioning between a build plate and an article to be manufactured during additive manufacturing. The substrate layer includes at least one layer, wherein the at least one layer comprises a bulk composition having a multiphase morphology, the bulk composition comprising a continuous phase of a matrix material comprising a reactive component; and a discontinuous phase including a plurality of particles of a non-reactive component; wherein the plurality of particles are distributed within the matrix material; and wherein the reactive component is chemically reactive with water, acid, or base, and wherein the non-reactive component is unreactive with water, acid, or base.

Another embodiment includes a substrate layer for positioning between a build plate and an article to be manufactured during additive manufacturing. The substrate layer includes at least two sublayers, wherein the at least two sublayers exhibit a galvanic potential relative to one another, and wherein the at least two sublayers react with one another in a galvanic reaction upon contact with the water, wherein the water contains an electrolyte.

BRIEF DESCRIPTION OF THE DRAWINGS

The patent or application file contains at least one drawing executed in color. Copies of this patent or patent application publication with color drawing(s) will be provided by the Office upon request and payment of the necessary fee. So that the manner in which the features and advantages of the system, products, and/or method so of the present disclosure may be understood in more detail, a more particular description briefly summarized above may be had by reference to the embodiments thereof which are illustrated in the appended drawings that form a part of this specification. It is to be noted, however, that the drawings illustrate only various exemplary embodiments and are therefore not to be considered limiting of the disclosed concepts as it may include other effective embodiments as well.

FIG. 1A depicts a single layer core-shell particle in accordance with certain embodiments of the present disclosure;

FIG. 1B depicts a multi-layer core-shell particle in accordance with certain embodiments of the present disclosure;

FIG. 2 depicts a bulk composition in accordance with certain embodiments of the present disclosure;

FIG. 3 is a schematic of a method and system for making the core-shell particles, bulk composition, and articles in accordance with certain embodiments of the present disclosure;

FIG. 4 depicts a frac ball in accordance with certain embodiments of the present disclosure;

FIG. 5 depicts an aerial drone in accordance with certain embodiments of the present disclosure;

FIG. 6 depicts another aerial drone in accordance with certain embodiments of the present disclosure;

FIG. 7 depicts a terrestrial drone in accordance with certain embodiments of the present disclosure;

FIG. 8A depicts a bolt in accordance with certain embodiments of the present disclosure;

FIG. 8B depicts a bullet in accordance with certain embodiments of the present disclosure;

FIG. 9A depicts a bulk composition contained within a bag for preventing contact with moisture;

FIG. 9B depicts an aerial drone contained within a bag for preventing contact with moisture;

FIGS. 11A-11D depict the formation and dissolution of a bulk composition;

FIGS. 13A-13E depict the formation of a billet that includes multiple different bulk compositions in accordance with the present disclosure;

FIGS. 14A and 14B depict the billet of FIGS. 13A-13E;

FIGS. 17A-17F depict the formation of an article on a build plate via additive manufacturing, and the dissolution of a layer of bulk material in accordance with the present disclosure for separation of the article from the build plate.

Figure 10A:
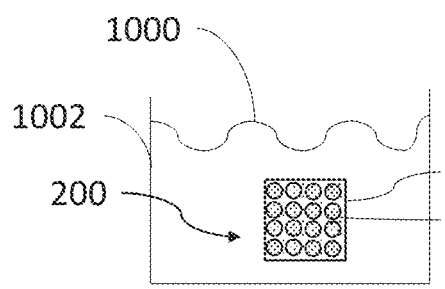
FIGS. 10A-10D depict the dissolution of a bulk composition in accordance with certain embodiments of the present disclosure.
Figure 10B:
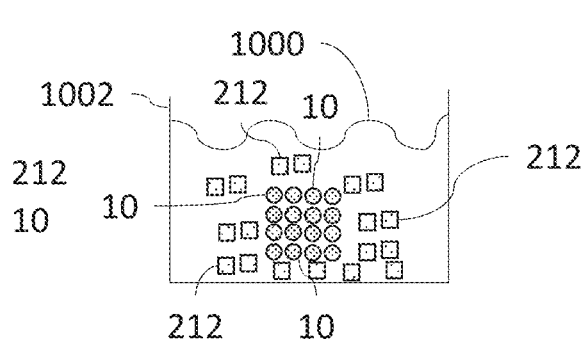

Products and methods according to present disclosure will now be described more fully with reference to the accompanying drawings, which illustrate various exemplary embodiments. Concepts according to the present disclosure may, however, be embodied in many different forms and should not be construed as being limited by the illustrated embodiments set forth herein. Rather, these embodiments are provided so that this disclosure will be thorough as well as complete and will fully convey the scope of the various concepts to those skilled in the art and the best and preferred modes of practice.

DETAILED DESCRIPTION

Certain embodiments of the present disclosure include dissolvable compositions and tools or other apparatus made therefrom, as well as to processes, systems, and apparatus for making and using such compositions, tools, and other apparatus.

In some embodiments, the compositions disclosed herein may be designed and engineered at the particle/powder level (e.g., providing coatings onto particles), as opposed to mixing various particles or powders together. Thus, particles having selectively designed coating layers thereabout may be formed. The thusly formed particles may then be consolidated into a bulk composition exhibiting unique properties relative to what would be exhibited in a composition in which the particles were simply mixed with other particles (as opposed to being coated with other compositions).

In some embodiments, the compositions and tools disclosed herein include multiple particles that have differing reaction rates in the presence of water, acid, or base. The dissolvability of such tools may be controlled to allow the tools to perform a desired function or task prior to degradation. In some embodiments, the degradation may occur in response to one or multiple environmental conditions including, but not limited to, temperature conditions, pressure conditions, pH conditions, and salinity conditions.

Composition

One embodiment of the present disclosure relates to solid compositions that are at least partially reactive, dissolvable, or otherwise degradable in environments that contain liquid (e.g., water), including water that contains an acid or a base therein. The compositions disclosed herein include at least one reactive component and at least one non-reactive component.

Reactive Component

The composition disclosed herein includes at least one reactive component. As used herein, a "reactive component" is an element or molecule or material or composition that is chemically reactive with water, acid, or base (collectively also referred to as a "liquid reactive material" or a "liquid reactive component"), in chemical displacement reaction. As would be understood by one skilled in the art, a chemical displacement reaction (e.g., a single-displacement reaction, also known as a single-replacement reaction), is a reaction by which element(s) in one molecule replace element(s) in another compound. This is often represented, generically, as: $A+B\text{-}C \rightarrow A\text{-}C+B$.

In some embodiments, the reactive component is or includes neutral water, water that contains an acid (e.g., aqueous acidic solution), or water that contains a base (e.g., aqueous basic solution) therein. Upon reaction, the reactive component dissolves or otherwise degrades. The reactive component may dissolve or degrade in the presence of water in a time frame ranging from 1 to 24 hours, or 2 to 24 hours, or 4 to 20 hours, or 6 to 18 hours, or 8 to 16 hours, or 10 to 14 hours, or 11 to 13 hours. As would be understood by one skilled in the art, a component is "chemically reactive" with water, acidic water, or basic water if the component undergoes a chemical reaction (e.g., a displacement reaction) when in contact with the water, acidic water, or basic water. As would be understood by one skilled in the art, a component is "dissolvable" within water, acidic water, or basic water if the component undergoes dissolution when incorporated into the water, acidic water, or basic water. As used herein, a component is "degradable" within water, acidic water, or basic water if the component undergoes degradation when incorporated into the water, acidic water, or basic water. "Degradation", as used herein, may include a breakdown of the reactive component via reaction, dissolution, or another mechanism. The reaction and dissolution discussed herein may be at standard temperature and pressure (STP) conditions.

The reactive component reacts with water, acid, or base via a displacement reaction. In certain embodiments, the reactive component does not react with water, acid, or base via a galvanic reaction. In certain embodiments, the composition does not react, dissolve, or otherwise degrade via a galvanic reaction mechanism. In certain applications, the water with or within which the reactive component reacts is water that is resident within a downhole well (e.g., an oil and/or gas well), such as ground water that is naturally resident within the well and/or water that is pumped into the well (e.g., drilling mud). The water may be distilled water, tap water, ground water, lake water, ocean water, or any other water.

In some embodiments, the water includes an acid, a base, or a salt therein. Examples of acids that may be within the water include, but are not limited to, hydrochloric acid (HCl); nitric acid ($HNO_3$); sulfuric acid $H_2SO_4$; hydrobromic acid (HBr); hydroiodic acid (HI); perchloric acid ($HClO_4$); and chloric acid ($HClO_3$). Examples of bases that may be within the water include, but are not limited to, hydroxides such as sodium hydroxide (NaOH); lithium hydroxide (LiOH); potassium hydroxide (KOH); rubidium hydroxide (RbOH); cesium hydroxide (CsOH); magnesium hydroxide (Mg(OH); calcium hydroxide (Ca(OH); strontium hydroxide (Sr(OH); and barium hydroxide (Ba(OH). Examples of salts that may be within the water include, but are not limited to, chloride salts, such as sodium chloride (NaCl); potassium chloride (KCl); calcium chloride (CaCl), and ammonium chloride ($NH_4Cl$). In some embodiments, the water is aqueous HCl, having an HCl concentration of from 0.1 to 99 vol. %, or from 1 to 98 vol. %, or from 5 to 95 vol. %, or from 10 to 90 vol. %, or from 20 to 80 vol. %, or from 30 to 70 vol. %, or from 40 to 60 vol. %. The pH of the water, with or within which the reactive component reacts, may be neutral, basic, or acidic. In some embodiments, the reaction between the reactive component and the reactant (e.g., the water, acidic component, basic component), may occur within a wide range of temperatures.

The reactive component may be a metal, metal alloy, metal oxide, or ceramic that is reactive with one or more of water, acidic water, and basic water. The reactive component may be or include copper (Cu), nickel (Ni), aluminum (Al), potassium (K), sodium (Na), calcium (Ca), magnesium (Mg), or alloys or ceramics thereof (e.g., an Mg, K, Na, or Ca ceramic). In some embodiments, the reactive component is or includes Titanium, Graphite, Fe, Li, W, Mo, a ceramic, a nitride, or an oxide.

The reaction of metals and metal oxides with water, acids, and bases would be understood by those skilled in the art. As an example of the reactivity of one exemplary reactive component (Ni) with a reactant (HCl), Ni reacts with HCl in a single displacement reaction, as follows:

$$Ni+2HCl \rightarrow NiCl_2 \text{ (Nickel Chloride)}+H_2 \text{ (Hydrogen gas)}$$

While the "reactant" that reacts with the reactive component is described herein as a "liquid" reactive component, it is not necessarily in liquid form. In some embodiments, the reactive component is reactive upon contact with a reactant that is a gaseous component, such as water vapor.

Table 1, below, sets forth some exemplary reactive components suitable for use in accordance with the present disclosure, as well as associated melting points, specific gravities, and indications of solubility in water.

TABLE 1

Exemplary Reactive Components

| Name | Melting Point | Specific Gravity | Soluble |
|---|---|---|---|
| $Al_4C_3$ | 2100 | 2.36 | Yes |
| AlN | 3000 | 3.3 | Yes |
| AlP | 2550 | 2.4 | Yes |
| Ba | 727 | 3.6 | Yes |
| $BaH_2$ | 1200 | 4.1 | Yes |
| BaSe | 1780 | 5 | Yes |
| $BaSi_2$ | 1180 | 0 | Yes |
| BP | 1125 | 0 | Yes |
| CaO | | | |
| $CaAl_2O_3$ | 1605 | 2.9 | Yes |
| $CaC_3$ | 2300 | 2.2 | Yes |
| $CaH_2$ | 1000 | 1.7 | Yes |
| $Ca_2P_2$ | 1670 | 2.5 | Yes |
| $CaSi_2$ | 1040 | 2.5 | Yes |
| $CaC_2$ | 2250 | 5.47 | Yes |
| CoB | 1460 | 7.25 | Yes |
| Lithium Compounds | | | |
| $Li_3N$ | 813 | 1.27 | Yes |
| $Mg_2Si$ | 1102 | 1.99 | Yes |
| $Mg_2$ | 2226 | 1.8 | Yes |
| $RuO_2$ | 1300 | 7.85 | Yes |
| SiS | 1090 | 1.85 | Yes |
| $Na_2O$ | 1134 | 2.27 | Yes |
| $ZrCl_3$ | 627 | 3.05 | Yes |

Non-Reactive Component

The composition disclosed herein includes at least one non-reactive component. As used herein, a "non-reactive component" is an element or molecule that is chemically unreactive (e.g., at STP) with water, acid, or base in chemical displacement reaction (i.e., is non-reactive or not chemically reactive with water, acid, or base in chemical displacement reaction). In some embodiments, the non-reactive component is non-dissolvable (i.e., does not dissolve) within water, acidic water, or basic water (e.g., at STP). That is, the non-reactive component may be a molecule or element or material or composition that is not chemically reactive with water, acids (e.g., HCl), or bases, and is chemically inert with respect to reaction with water, acids (e.g., HCl), or bases via displacement reaction.

In some embodiments, after contact with water, acid or base, the non-reactive component does not react with the water, acid or base within a time frame ranging from 1 to 24 hours, or 2 to 24 hours, or 4 to 20 hours, or 6 to 18 hours, or 8 to 16 hours, or 10 to 14 hours, or 11 to 13 hours.

The non-reactive component may be a metal, metal alloy, ceramic, carbide, oxide, nitride, or polymer (e.g., plastic). Examples of non-reactive components suitable for use herein include, but are not limited to, Ni-Chrome alloys, such as INCONEL® nickel-chromium alloy 625 or INCONEL® 718; Tantalum or alloys thereof; Titanium or alloys thereof, Tungsten or alloys thereof; carbides (e.g., metal carbides, such as zirconium carbide); and iron or alloys thereof, including steel (e.g., 4140 alloy steel). In some embodiments, the non-reactive component is a refractory material. For example, the non-reactive component may be a refractory material as determined in accordance with ASTM C71. In certain embodiments, the non-reactive component is not Mg or alloys or ceramics thereof; or Al or alloys or ceramics thereof. In certain embodiments, the non-reactive component does not include, Mg or alloys or ceramics thereof; or Al or alloys or ceramics thereof. In certain embodiments, the non-reactive component, in isolation from the reactive component, is not mixed with or otherwise combined with Mg or alloys or ceramics thereof; or Al or alloys or ceramics thereof. The reactive component and the non-reactive component are not chemically reactive with one another (e.g., do not react via displacement reactions, galvanic reactions, or other chemical reactions at STP).

In some embodiments, each core particle of the non-reactive component has a particle size ranging from 1 to 200 μm, or from 10 to 190 μm, or from 20 to 180 μm, or from 30 to 170 μm, or from 40 to 160 μm, or from 50 to 150 μm, or from 60 to 140 μm, or from 70 to 130 μm, or from 80 to 120 μm, or from 90 to 110 μm or any range therebetween.

Particle Morphology

With reference to FIG. 1A, in some embodiments non-reactive component 10 is in the form of a particle or powder, and reactive component 12 is in the form of a coating layer disposed on an outer surface of non-reactive component 10. The particle or powder of non-reactive component 10 may be fully coated with the coating layer of reactive component 12, forming a continuously coated particle or powder, or the particle or powder may be only partially coated with the coating layer of reactive component 12, forming a partially coated particle or powder. As such, an outer surface area of the particle or powder of non-reactive component 10 is fully or at least partially coated with a layer of the reactive component 12.

The composition disclosed herein includes a core-shell particle 100a morphology with non-reactive component 10 forming the core and reactive component 12 forming the shell. While the particle or powder of non-reactive component 10 is described herein as being at least partially coated with at least one layer of a reactive component 12, one skilled in the art would understand that, within a bulk population of such coated particles, some individual particles may be more or less coated than other individual particles, and there may be some particles that are not coated at all with reactive component 12. However, in such a bulk population of coated particles (or powder) the plurality of such particles will be coated with at least some of reactive component 12.

Some embodiments of core shell particle 100a include a single coating layer of reactive component 12 disposed about a core particle of non-reactive component 10, as shown in FIG. 1A. In other embodiments, multiple coating layers of reactive component(s) 12 are disposed about a core particle of non-reactive component 10. As shown in FIG. 1B, core shell particle 100b includes core particle of non-reactive component 10 with two coating layers of reactive components 12a and 12b. While shown as having two coating layers of reactive components 12a and 12b, one skilled in the art would understand that multilayer core-shell particles may have more than two coating layers. Each coating layer of the multilayer core-shell particle may be the same as or different than other layers of the multilayer core-shell particle. In some embodiments, each coating layer of the multilayer core-shell particle is different than adjacent coating layer(s) of the multilayer core-shell particle. In other embodiments, each coating layer of the multilayer core-shell particle is the same as adjacent coating layer(s) of the multilayer core-shell particle.

In some embodiments, reactive component 12 and non-reactive component 10 are not galvanically reactive with each other, such that, in the presence of electrolyte containing water reactive component 12 and non-reactive component 10 do not react with one another via an anode and cathode reaction.

In some embodiments, the composition disclosed herein includes a chloride-based salt, such as an Na, Ca, K, or another such chloride-based salt. The chloride-based salt may be the same as that described in U.S. Provisional Patent Application No. 62/658,407, filed on Apr. 16, 2018, and as described in U.S. patent application Ser. No. 16/385,267, filed on Apr. 16, 2019, the entireties of which are incorporated herein by reference. The chloride-based salt may be mixed with the core-shell particles or may form a coating layer of the core-shell particles.

In certain embodiments, the composition disclosed herein includes metal, ceramic, carbide, oxide, nitride, or combinations thereof.

The bulk composition disclosed herein dissolve or degrade in the presence of water in a time frame ranging from 1 to 24 hours, or 2 to 24 hours, or 4 to 20 hours, or 6 to 18 hours, or 8 to 16 hours, or 10 to 14 hours, or 11 to 13 hours.

Exemplary Composition

In one embodiment, the composition disclosed herein includes core particles of INCONEL® nickel-chromium alloy 625 that are coated with at least one layer of nickel. In some embodiments, an additional layer of nickel-chrome alloy is coated about the at least one Ni coating layer, serving to slow down the reaction rate of the bulk material of the composition. The amount of Ni in the nickel-chrome alloy may be controlled to control the reaction rate of the coating layer thereof, where more Ni, relative to chrome, leads to a faster reaction rate.

Formation of Core-Shell Particles

The core-shell particles of the composition disclosed herein may be formed via disposing one or more layers about a core particle. The core particle is at least partially composed of the non-reactive component disclosed herein. In some embodiments, the core particle is entirely composed of the non-reactive component disclosed herein. At least one of the one or more layers disposed about the core particle is at least partially composed of the reactive component disclosed herein. In some embodiments, at least one of the one or more layers disposed about the core particle is entirely composed of the reactive component disclosed herein. In some embodiments, each of the one or more layers disposed about the core particle are at least partially composed of the reactive component disclosed herein. In some embodiments, each of the one or more layers disposed about the core particle are entirely composed of the reactive component disclosed herein. The "reactive component" may be a single reactive component in accordance with the present disclosure, or may be a mixture of one or more reactive components in accordance with the present disclosure. The "non-reactive component" may be a single non-reactive component in accordance with the present disclosure, or may be a mixture of one or more non-reactive components in accordance with the present disclosure.

In some embodiments, the one or more layers are disposed about the core particle (and any intermediate layers therebetween) via depositing, coating, or otherwise applying the layers onto the core particle (and any intermediate layers therebetween). In some such embodiments, one or more of the layers are applied to the core particle (and any intermediate layers therebetween) via chemical vapor deposition (CVD), atomic layer deposition, plating, or electroless plating.

With reference to FIG. 3, reactive component 10, or a precursor thereof, may be input into fluidized bed reactor 300 or another reactor suitable for CVD. Non-reactive component 12, or a precursor thereof, may be input into fluidized bed reactor 300 or another reactor suitable for CVD. Within reactor 300, reactive component 12 may be deposited onto the particles of non-reactive component 10 via CVD; thereby, at least partially coating the particles of non-reactive component 10 to form the core-shell particles 100.

Bulk Morphology

In bulk, the composition disclosed herein may have a multiphase (e.g., two or more phases) morphology of particles of the non-reactive component distributed within a matrix material, with the matrix material composed at least partially of the reactive component. With reference to FIG. 2, bulk composition 200 includes matrix material 212. Matrix material 212 is composed at least partially of, or entirely of, the reactive component disclosed herein. Embedded and distributed within matrix material 212 are a plurality of core particles that are at least partially composed of, or entirely composed of, non-reactive component 10. Thus, matrix material 212 forms a continuous phase of bulk composition 200, and non-reactive component 10 forms a discontinuous, distributed phase of bulk composition 200. Matrix material 212 functions to hold core particles of non-reactive component 10 in position within the bulk composition 200.

In some embodiments, multiple different core particles of different non-reactive components are in the bulk composition 200. For example, bulk composition 200 may include a plurality of steel core particles and a plurality of nickel-chrome alloy core particles. Thus, bulk composition 200 is not limited to including a single non-reactive component 10, and may include a mixture of different non-reactive components.

Formation of Bulk Composition

With further reference to FIG. 3, bulk composition 200 may be formed via consolidating core-shell particles 100 into bulk composition 200 having a consolidated shape. Core-shell particles 100 may be input into a consolidating apparatus or system 320, wherein core-shell particles 100 are consolidated to form bulk composition 200, such that bulk composition 200 exits consolidating apparatus or system 320. Consolidating apparatus or system 320 may be or include an apparatus or system configured for solid-state processing of core-shell particles 100, forging (e.g., press forging) of core-shell particles 100, casting of core-shell particles 100, extruding of core-shell particles 100, or additive manufacturing (e.g., 3D printing) of core-shell particles 100.

In some embodiments, the composition includes a plurality of particles (core and coating particles) bonded together by various manufacturing processes requiring heat and/or pressure or using additive manufacturing methods. U.S. patent application Ser. No. 15/464,226 provides background relevant to certain embodiments of the present disclosure and is incorporated herein by reference in its entirety. In particular, paragraphs [0096]-[0107] of U.S. patent application Ser. No. 15/464,226 discuss additive manufacturing techniques. Also, U.S. patent application Ser. No. 15/464,226, discusses various tool and devices, including medical implements, that may be constructed from the composition of the present disclosure. These methods of additive manufacturing disclosed in U.S. patent application Ser. No. 15/464,226 may be used in the additive manufacturing of core-shell particles 100 into bulk composition 200.

Core-shell particles 100 may be input into consolidating apparatus or system 320 as a plurality of separate, loose, solid core-shell particles 100. Within consolidating apparatus or system 320, heat and/or pressure may result in the coating layers of core-shell particles 100 to at least partially melt, melding together into a single structure that, upon cooling, forms matrix material 212. Thus, matrix material 212 may form a unitary solid-state structure that is a continuous phase that surrounds a plurality of particles of the non-reactive component 10. In some embodiments, the non-reactive component 12 does not melt within consolidating apparatus or system 320. While the plurality of particles of non-reactive component 12 are shown in FIG. 2 as each being separate, discrete particles that are distributed within matrix material 212 and are not in contact with one another, in some embodiments at least some of the particles of non-reactive component 12 are in contact with other of the particles of non-reactive component 12 within matrix material 212.

The matrix material 212 may be at least 1 wt. %, or at least 2 wt. %, or at least 5 wt. %, or at least 10 wt. %, or at least 20 wt. %, or at least 30 wt. %, or at least 40 wt. %, or at least 50 wt. %, or at least 60 wt. %, or at least 70 wt. %, or at least 80 wt. %, or at least 90 wt. %, or at least 95 wt. %, or at least 98 wt. %, or at least 99 wt. % of the bulk composition, based on a total weight of the bulk composition. In some embodiments, the matrix material 212 is from 1 to 50 wt. %, or from 1 to 30 wt. %, or from 5 to 25 wt. %, or from 10 to 20 wt. %, or from 5 to 10 wt. % of the bulk composition, based on the total weight of the bulk composition.

The reactive component 12 may be at least 1 wt. %, or at least 2 wt. %, or at least 5 wt. %, or at least 10 wt. %, or at least 20 wt. %, or at least 30 wt. %, or at least 40 wt. %, or at least 50 wt. %, or at least 60 wt. %, or at least 70 wt. %, or at least 80 wt. %, or at least 90 wt. %, or at least 95 wt. %, or at least 98 wt. %, or at least 99 wt. % of the bulk composition, based on the total weight of the bulk composition. In some embodiments, the reactive component 12 is from 1 to 50 wt. %, or from 1 to 30 wt. %, or from 5 to 25 wt. %, or from 10 to 20 wt. %, or from 5 to 10 wt. % of the bulk composition, based on the total weight of the bulk composition.

The non-reactive component may be at least 1 wt. %, or at least 2 wt. %, or at least 5 wt. %, or at least 10 wt. %, or at least 20 wt. %, or at least 30 wt. %, or at least 40 wt. %, or at least 50 wt. %, or at least 60 wt. %, or at least 70 wt. %, or at least 80 wt. %, or at least 90 wt. %, or at least 95 wt. %, or at least 98 wt. %, or at least 99 wt. % of the bulk composition, based on the total weight of the bulk composition. In some embodiments, the non-reactive component 10 is from 99 to 50 wt. %, or from 99 to 70 wt. %, or from 95 to 75 wt. %, or from 90 to 80 wt. %, or from 95 to 90 wt. % of the bulk composition, based on the total weight of the bulk composition.

Articles of Manufacture and Formation Thereof

Bulk composition 200 may be formed into article of manufacture 330. In some embodiments, core-shell particles 100 are formed directly into an article of manufacture, without forming any intermediate bulk composition that is not an article of manufacture (i.e., the formation of the bulk composition and the article of manufacture is simultaneous, such that bulk composition is in the form of the article of manufacture). In other embodiments, as shown in FIG. 3, core-shell particles 100 are first formed into bulk composition 200, and then bulk composition 200 is formed into article of manufacture 330. Bulk composition 200 may be formed into article of manufacture 330 via solid-state processing, forging (e.g., press forging), casting, extruding or additive manufacturing (AM). Bulk composition 200 may be formed into article of manufacture 330 within article forming apparatus or system 340, which may be an apparatus or system configured for solid-state processing of bulk composition 200, forging of bulk composition 200, casting of bulk composition 200, extruding of bulk composition 200, or additive manufacturing (e.g., 3D printing) of bulk composition 200.

Examples of articles of manufacture that may be formed of bulk composition 200 include, but are not limited to, downhole tools and components for use in oil and/or gas wells, such as frac balls, frac plugs, piping, and tubing; unmanned terrestrial or aerial vehicles, such as drones (e.g., for military applications); bullets; electronics components; and medical components or tools. The articles of manufacture may be any article for which a controlled lifetime is required or desirable.

The composition shown and described herein may be processed via any number of materials processing techniques to form articles of manufacture or precursors thereof. U.S. patent application Ser. No. 14/948,204 provides certain relevant disclosure and is hereby incorporated by reference in its entirety. In particular, U.S. patent application Ser. No. 14/948,204 discloses various material forging techniques suitable for use herein in forming articles from bulk composition or in forming the bulk composition, including the dynamic forging discussed beginning in paragraph [0039] of U.S. patent application Ser. No. 14/948,204. U.S. Pat. No. 8,535,604 provides certain relevant disclosure and is hereby incorporated by reference in its entirety. In particular, U.S. Pat. No. 8,535,604 discloses various solid-state processing techniques suitable for use herein in forming articles from bulk composition or in forming the bulk composition, including those discussed with reference to FIG. 4 of U.S. Pat. No. 8,535,604. In some embodiments, the solid-state processing used to form the bulk composition or articles of manufacture includes casting spark plasma sintering (SPS), hot isostatic pressing (HIP), or any of the other processing techniques described elsewhere herein.

In certain embodiments, the articles are formed exclusively and entirely of the composition disclosed herein, such that the articles do not include or contain any other material other than the composition disclosed herein. In other embodiments, the articles include additional materials other than the composition disclosed herein. For example, the articles or bulk compositions disclosed herein may include at least 10 wt. %, or at least 20 wt. %, or at least 30 wt. %, or at least 40 wt. %, or at least 50 wt. %, or at least 60 wt. %, or at least 70 wt. %, or at least 80 wt. %, or at least 90 wt. %, or at least 95 wt. %, or at least 98 wt. %, or at least 99 wt. %, or 100 wt. % of the composition disclosed herein, based on a total weight of the article disclosed herein. In some embodiments, the matrix material 212 is from 1 to 50 wt. %, or from 1 to 30 wt. %, or from 5 to 25 wt. %, or from 10 to 20 wt. %, or from 5 to 10 wt. % of the article, based on the total weight of the article.

Frac Balls

In some embodiments, the articles are downhole tools, such as hydraulic fracturing balls (frac balls), such as frac ball 400 shown in FIG. 4. In use, the frac balls may be injected downhole for fracturing a well. Upon contact with the liquid downhole (e.g., the drilling mud) the degradation of the composition begins. By controlling the type, amount, and arrangement of the materials, the lifetime of the composition in a downhole environment can be controlled.

Drones

In other embodiments, the article is a drone, such as areal drone 500 shown in FIG. 5, areal drone 600 shown in FIG. 6, or terrestrial drone 700 shown in FIG. 7. In some embodiments, the entirety of the drone is formed of the composition. In other embodiments, the frame, body, and optionally other portions of the drone are formed of the composition, while other portions of the drone are not formed of the composition disclosed herein. In use, a drone formed of the composition may be flown or driven to a desired location (e.g., for intelligence surveillance in military applications). As the drone is at least partially degradable/dissolvable upon contact with moisture, the drone may be utilized as a disposable drone without risking discovery and/or retrieval by another. For example, typically a drone battery life limits the range of a drone. The drone may be flown or driven to approximately half of its battery life, after which, the drone must either be returned to "base" or the drone will be at risk of failing over potentially enemy territory due to loss of battery power. However, with a dissolvable drone, the drone may be flown or driven for the entirety or nearly the entirety of its battery life. The flight or drive path of the drone may be planned such that at or towards the end of the flight or drive path, the drone passes over or near a body of water. Thus, the drone may be purposefully flown or driven into the water to dissolve upon contact therewith. As such, others attempting to retrieve the drone may be prevented from such retrieval.

In other embodiments, the composition may be used to form electronics, medical equipment, disposable vehicles, or any other equipment where a controlled lifetime is required or desirable. For example, FIG. 8A depicts a bolt 800. FIG. 8B depicts a bullet 850 composed at least partially of the bulk composition disclosed herein. In some embodiments, an outer-shell of a non-reactive material encases the bulk composition of the bullet.

In some embodiments, due to the reactivity of the composition to moisture, the core-shell particle, bulk composition or article of manufacture is bagged or otherwise sealed and/or insulated from the environment, as ambient moisture within the air may cause the reaction(s) to begin. For example, FIG. 9A depicts bulk composition 200 within bag 900 (e.g., a plastic bag), and FIG. 9B depicts drone 600 within bag 900.

Control of Reaction

The reaction rate of the bulk composition, once in contact with water (acidic, basic, or neutral), may be controlled by varying the number of coating layers about the core particle, with more layers providing a longer residence time of the bulk composition in contact with the water.

The reaction rate of the bulk composition, once in contact with water (acidic, basic, or neutral), may be controlled by varying the thickness of each coating layer, with thicker layers of a particular material providing a longer residence time of the bulk composition in contact with the water.

The reaction rate of the bulk composition, once in contact with water (acidic, basic, or neutral), may be controlled by varying the composition of each coating layer. For example, some compositions are more reactive and react at a faster rate in the presence of water than other compositions.

The reaction rate of the bulk composition, once in contact with water (acidic, basic, or neutral), may be controlled by varying the weight percentages (absolute and relative) of the core particle and each coating layer, based on the total weight of the core-shell particle, with higher weight percentages of a particular material providing a longer residence time of the bulk composition in contact with the water.

The reaction rate of the bulk composition, once in contact with water (acidic, basic, or neutral), may be controlled by varying the arrangement of the coating layers. For example, in a two-coating layer core-shell particle, the slower reaction rate material of the two coating layers may form the outermost layer that contacts the water first, and the faster reaction rate materials of the two coating layers may form the innermost layer that contacts the water second. Such an arrangement may allow the composition to remain intact, degrading more slowly, when the article formed therefrom is being introduced and used within the environment containing water (e.g., while using a frac ball to fracture a well). The parameters of the outermost layer may be configured to provide a sufficient residence time within the environment, such that after use of the article is complete and it is desired that the article degrade away, the outermost layer is fully or substantially degraded and the faster reacting innermost layer begins to react with the water, allowing the article to be removed from the wellbore after use thereof is complete. The ability to remove such an article from a wellbore in such a timed manner may allow for more efficient and economical operation of the wellbore.

In some embodiments, the bulk composition or article of manufacture made therefrom is designed and controlled to dissolve within a selected period of time, which may vary from hours (less than a day), to days (less than a week), to weeks depending on the environmental conditions (e.g., liquid, temperature, pressure, etc.) and desired outcomes.

The coating layers of reactive material may be selected and arranged to provide the desired residence time of the article of manufacture within water prior to dissolution or degradation of the article of manufacture, and the core particle may be selected to provide the desired strength to the article of manufacture. Once the article of manufacture is sufficiently degraded via reaction between the water, acid, or base and the reactive component, the components of the bulk composition are no longer maintained in the bulk configuration, as the matrix formed by the reactive component is broken down via reaction. As such, the non-reactive core particle is in the form of solid particles or powder of a size small enough to be freely flow within the wellbore and to be pumped out of the well along with the drilling mud.

In some embodiments, a competing reactant is introduced into the environment to control the reaction rate of the composition. As used herein a "competing reactant" is a chemical compound or element that is reactive with water, acid, or base, such that the competing reactant reacts with the water, acid, or base in competition with the reaction between the reactive component and the water, acid, or base; thereby, slowing down the reaction rate of the reactive component with the water, acid, or base.

Methods and Systems for Forming the Composition

Some embodiments relate to methods and systems for forming the core-shell particles, bulk composition, and articles of manufacture disclosed herein. For example, the system may be in accordance with system 3000, as shown in FIG. 3 and described elsewhere herein.

Generally, the composition may be formed by providing a core particle and applying one or more coatings to the core particle, such as via chemical vapor deposition of the coatings onto the core particle within a fluidized bed reactor. The dissolvable composition provided herein may be formed of a core particle with a single coating or with multiple coatings.

Permutations

There are numerous variations in the arrangements and constituencies of the composition disclosed herein. Table 2, below, sets forth some permutations of particle combinations of reactive and non-reactive components, including coated particles and uncoated particles.

TABLE 2

| Particle Combinations | | |
|---|---|---|
| Particle 1 | Particle 2 | Particle 3 (other property) |
| Uncoated | Uncoated | Reaction control, strength, other properties |
| Coated Particle | Uncoated | |
| Uncoated | Coated | Same |
| Coated | Coated | Same |
| Uncoated | Uncoated | Particle/Coated |
| Uncoated | Uncoated | Particle coated |
| Combine Particle 1 and 2 | | Particle Coated and Uncoated |
| Multi-layers of Particles 1 and/or 2 | Uncoated or Coated | |
| Combine Particles 1, 2 and 3 | | |

Example Reactions

Some exemplary reactions of oxides reactive components with water, acid, or base are set forth below.

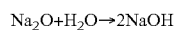

$$Na_2O+H_2O \rightarrow 2NaOH$$

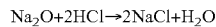

$$Na_2O+2HCl \rightarrow 2NaCl+H_2O$$

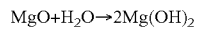

$$MgO+H_2O \rightarrow 2Mg(OH)_2$$

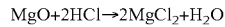

$$MgO+2HCl \rightarrow 2MgCl_2+H_2O$$

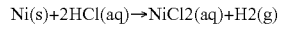

$$Ni(s)+2HCl(aq) \rightarrow NiCl2(aq)+H2(g)$$

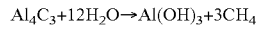

$$Al_4C_3+12H_2O \rightarrow Al(OH)_3+3CH_4$$

In some embodiments, the composition degrades via an acid-oxide reaction, a base-oxide reaction, or a water-oxide reaction.

Another exemplary reaction relevant to the present disclosure is the reaction of Al, a reactive component, with water that contains NaOH in accordance with the following reaction:

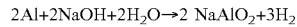

$$2Al+2NaOH+2H_2O \rightarrow 2\ NaAlO_2+3H_2$$

Thus, Al may be a coating layer about an Mg core, and may react with NaOH or other hydroxides, such as Ca or K hydroxides. The NaOH contacts and reacts with the Al, resulting in dissolution of the Al coating layer, matrix material. As is evident from the above, the reactive component may directly react with the water molecule, with the acid (e.g., HCl) or with the base (e.g., NaOH).

Mechanism of Dissolution

As the core particles are formed of a non-reactive component, the surface area of the reactive matrix material 212 that is exposed to contact with a reactant (water, acid, base) is reduced, relative to the reactive surface area that would contact the reactant if the core particles were also reactive with the reactant. The reaction, thus, occurs within the matrix material 212, within the space between non-reactive core particles. As such, the reaction rate is slower, relative to what the reaction rate would be if the core particles were also reactive with the reactant. The thickness and/or composition of the reactive coating provides the pathway or limiter to the reaction to occur.

Figure 10C:
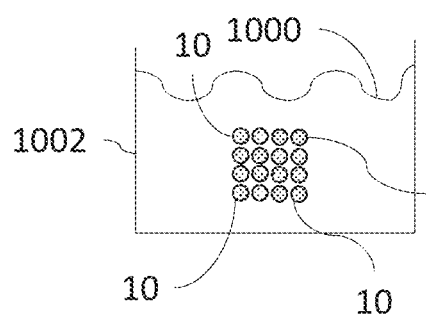
Figure 10D:
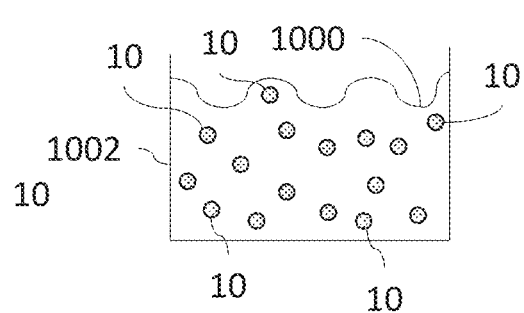

With reference to FIGS. 10A-10D, dissolution of bulk composition 200 within water 1000 is described. Composition 200 is positioned within water 1000, here shown as contained within tank 1002. Upon contact with water 1000, reactive matrix material 212 of composition 200 begins to chemically react with the water (which may be neutral, acidic, or basic) or a constituent thereof (e.g., an ion). As shown in FIG. 10C, matrix material 212 is eventually fully or substantially reacted and, thus, no longer present, at least in the form of matrix material 212, leaving behind unsupported core particles of non-reactive component 10. The core particles of non-reactive component 10 may then spread out within the water. In some embodiments, the core particles of non-reactive component 10 are of a size sufficient small that the core particles of non-reactive component 10 may freely flow, such as within a wellbore and to be pumped out of the well along with the drilling mud.

In some embodiments, at least 1 wt. %, or at least 2 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 98 wt. %, or at least 99 wt. % of the core-shell particles disclosed herein are reactive and/or dissolvable in the presence of water, acid, or base, based on the total weight of the core-shell particles.

In some embodiments, at least 1 wt. %, or at least 2 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 98 wt. %, or at least 99 wt. % of the bulk composition disclosed herein is reactive and/or dissolvable in the presence of water, acid, or base, based on the total weight of the bulk composition.

In some embodiments, at least 1 wt. %, or at least 2 wt. %, or at least 5 wt. %, or at least 10 wt. %, or at least 15 wt. %, or at least 20 wt. %, or at least 25 wt. %, or at least 30 wt. %, or at least 35 wt. %, or at least 40 wt. %, or at least 45 wt. %, or at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, or at least 95 wt. %, or at least 98 wt. %, or at least 99 wt. % of the articles disclosed herein are reactive and/or dissolvable in the presence of water, acid, or base, based on the total weight of the articles.

With reference to FIGS. 11A-11D, core particles of non-reactive component 10 (FIG. 11B) and reactive component 12 (FIG. 11A) may be selected and combined into a bulk composition 200 (FIG. 11C), as disclosed herein. As shown in FIG. 11D, upon contact with water (acidic, neutral or basic), matrix material 212 may begin to react with the water. The outermost portions of matrix material (closest to the surface of bulk composition 200) will react first due to contact with the water. As matrix material 212 reacts, dissolving into the water, core particles of non-reactive component 10 will be released from bulk composition 200. However, as is evidence from FIG. 11D, the core particles of non-reactive component 10 will not all release at the same time, but only as the matrix material 212 dissolves such that it is no longer surrounding a particular core particle of non-reactive component 10 will that particular core particle of non-reactive component 10 be released. FIG. 11D shows two core particles of non-reactive component 10b released from bulk composition 200, falling off on a layer-by-layer basis, with the remaining core particles of non-reactive component 10 still contained within matrix material 212.

Within bulk composition 200, matrix material 212 reacts with and dissolves with water at a higher rate than core particles of non-reactive component 10. Core particles of non-reactive component 10 exhibit no or low reactivity with the water. As matrix material 212 reacts and dissolves away from bulk composition 200, pathways (e.g., cracks within bulk composition) are formed to further cause degradation of bulk composition 200. In one exemplary reactive environment, the liquid reactant is an aqueous HCl environment of water containing from 0.1 to 40 volume percent of HCl. The core particles of non-reactive component 10 may be, for example INCONEL® 625, INCONEL® 718, or a Ni—Cr alloy that is resistant to acid (e.g., HCl). In some embodiments, the core particles of non-reactive component 10 may be a ceramic micro-balloon, nitride, carbide, oxide, or other reactions-resistant material. In some embodiments, reactive component 12 and matrix material 212 may be or include a metal, such as Al, Mg, Ni, Ti, V, or an alloy thereof that is reactive with the environment. In some embodiments, one or more coating layers about the core particles of non-reactive component 10 are or include a reaction inhibitor. As used herein, a "reaction inhibitor" is an element, molecule, or compound or composition that slows the reaction rate between reactive component 12 and the liquid reactant. Some exemplary reaction inhibits include Ta, Mo, and Ni—Cr. The reaction inhibitors may be a separate coating layer or may be mixed in with reactive component 12. In some embodiments, the thickness or thinness of coating layers of reactive component 12 are selected to slow or speed the reaction rate with the water. The reaction rate may be a function of the coating thickness, coating composition, and composition of the environmental liquid reactant.

Articles of Multiple Different Bulk Compositions

In some embodiments, the articles disclosed herein include multiple different bulk compositions in accordance with the present disclosure. For example, one portion of an article may be or include a first bulk composition in accordance with the present disclosure, while another portion of the article may be or include a second bulk composition in accordance with the present disclosure, where the second bulk composition is different than the first bulk composition. The first and second bulk compositions may differ in core particles, matrix materials, or both. The first and second bulk compositions may differ in: the composition of, mixture of, particle size of the core particles contained therein, or combinations thereof; the composition of, thickness of, number of, arrangement of coating layers applied to the core particles therein, or combinations thereof; the mixture of coated core particles therein; or combinations thereof.

Figure 12:
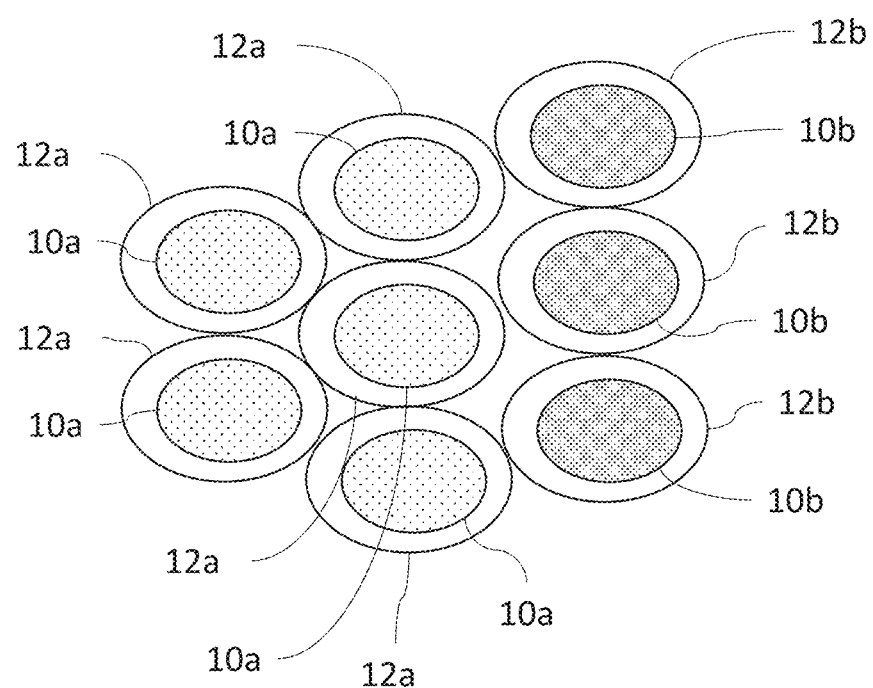
FIG. 12 depicts a mixture of different coated core particles for use in forming bulk compositions and articles in accordance with the present disclosure.

FIG. 12 depicts one mixture of different coated core particles. When using such mixtures of different coated core particles, one type of coated core particles may be used to form one portion of an article, and another type of coated core particles may be used to form another portion of the article.

A first exemplary coated core-shell particle includes: a non-reactive component core of Mg with a first reactive component coating of Ni coated the Mg, and a second reactive component coating of Al coated about the Ni. A bulk composition of the first exemplary coated core-shell particles may exhibit a reaction rate of 250 mg/cm$^2$/hour.

A second exemplary coated core-shell particle includes: a non-reactive component core of Mg with a first reactive component coating of Ni coated the Mg. A bulk composition of the second exemplary coated core-shell particles may exhibit a reaction rate of 750 mg/cm$^2$/hour.

A slower coated core-shell particle may be combined with a faster coated core particle. For example, a bulk composition having a reaction rate of from 250 to 750 mg/cm$^2$/hour may form one part of a tool, while a bulk composition having a reaction rate of about 10 mg/cm$^2$/hour may form another art of the tool. The reaction rates of the reactive components or bulk compositions disclosed herein may range from 1 to 1,000 mg/cm$^2$/hour, or from 10 to 750 mg/cm$^2$/hour, or from 20 to 500 mg/cm$^2$/hour, or from 50 to 250 mg/cm$^2$/hour, or from 100 to 200 mg/cm$^2$/hour. In some embodiments, the reactive component of the bulk composition is reactive with the water or contents thereof (e.g., chloride, nitride, hydrogen), is reactive with coatings or other materials that are dissolving into water (e.g., is reactive with other coating layers that are dissolving into the water), or combinations thereof.

In some embodiments, a bulk composition of a relatively slower reaction rate may form an outer portion of an article, such as the outer shell of a frac ball, and a bulk composition of a relatively faster reaction rate may form an inner portion of an article, such as the inner core of the frac ball. This arrangement may be reversed, such that a bulk composition of a relatively faster reaction rate may form an outer portion of an article, and a bulk composition of a relatively slower reaction rate may form an inner portion of an article.

With reference to FIGS. 13A-13E, the manufacture of one exemplary billet that includes multiple different bulk compositions in accordance with the present disclosure is described. As shown in FIG. 13A, a first portion of first bulk composition 200a is packed into a bottom of form 1300. Tube 1350 is then inserted into form 1300, and second and third portions of first bulk composition 200a are packed into sides of form 1300. Tube 1350 is at least partially filled with second bulk composition 200b. After filling the tube 1350 with second bulk composition 200b to the described level, tube 1350 is removed and a fourth portion of first bulk composition 200a is packed into form 1300. First and second bulk compositions 200a and 200b may then be consolidated into a unitary structure, such as via placing form 1300 in a forge. FIGS. 14A and 14B depict billet 1400. In some embodiments, first bulk composition 200a reacts at a faster rate than second bulk composition 200b. In some embodiments, first bulk composition 200a reacts at a slower rate than second bulk composition 200b. In some embodiments, first bulk composition 200a and second bulk composition 200b react at the same rate, but different in different respects. The billets and other articles are not limited to the shape, arrangement, and configuration shown in FIGS. 14A and 14B, and may have other shapes and configurations, and may include more or less than two different bulk compositions. For example, multiple tubes may be used to form multiple layers within an article during the pressing process described in FIGS. 13A-13E.

Additive Manufacturing Substrate

Figure 15:
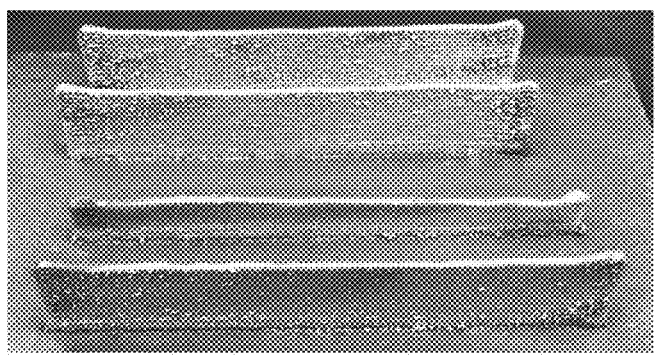
FIG. 15 is an image of an additive manufactured article.
Figure 16A:
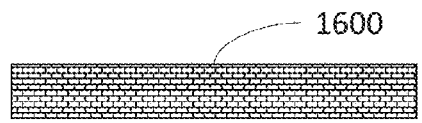
FIGS. 16A-16C depict the formation of an article on a build plate via additive manufacturing.
Figure 16B:
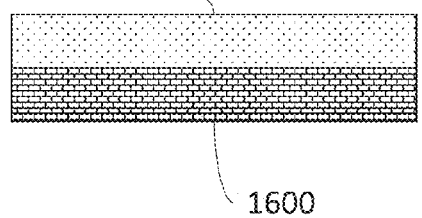
Figure 16C:
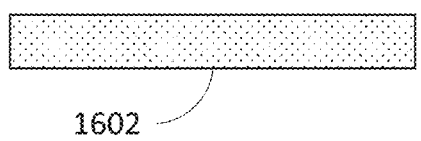

In some embodiments, the bulk composition can be formed into and/or used as a substrate to be positioned over a build plate used during additive manufacturing (3D printing). FIG. 15 is an image of a copper-based build specimen additive manufactured on a steel-based build plate. FIGS. 16A-16C depict a typical, prior art process for additive manufacturing articles on a build plate. Onto build plate 1600 (FIG. 16A), is deposited material for the layer by layer construction of article 1602 (FIG. 16B) via additive manufacturing techniques that are well known to those skilled in the art. After article 1602 is manufactured, the separation of article 1602 (FIG. 16C) from build plate 1600 can require cutting, breaking, or machining the article 1602 form the build plate 1600, such as via electrical discharge machining. Such processes can be time consuming, financially costly, and can result in damage to expensive build plates and/or the additive manufactured article.

With reference to FIGS. 17A-17F, in some embodiments, a layer of the bulk composition disclosed herein may be deposited between the build plate and article to allow for easier, faster, and more affordable removal of the article, with reduced risk of damage to the build plate and article. Build plate 1700 is provided (FIG. 17A), onto which layer 1702 of the bulk composition disclosed herein is deposited (FIG. 17B). In some embodiments, layer 1702 is additive manufactured onto build plate 1700 in situ. In other embodiments, layer 1702 is pre-formed, and is positioned onto build plate 1700. Article 1750 is additive manufactured onto layer 1702 (FIG. 17C), such that layer 1702 is positioned between build plate 1700 and article 1750. Article 1750 may be composed of any material capable of being manufactured via additive manufacturing, and is not limited to the materials disclosed herein. Article 1750 is composed of a material that is not reactive or dissolvable within water. Article 1750, on build plate 1700 with layer 1702 therebetween, is placed into water 1710 (FIG. 17D), here shown as being within tank 1712, such that layer 1702 reacts with the water (neutral, acidic, or basic) and dissolves away (FIG. 17C). As such, article 1750 is retrievable from build plate 1700 without requiring any machining, such as cutting, breaking, electrical discharge machining, or other machining.

In some embodiments, layer 1702 is tailored to have a desired coefficient of thermal expansion (CTE). While referred to as "layer", layer 1702 may actually be or include multiple layers of the bulk composition. Layer 1702 may include core particles with one or more coating layers. In some embodiments, layer 1702 is cold sprayed or otherwise solid state processed (e.g., friction stir weld) onto build plate 1700. Layer 1702 may tailorable by melting point and CTE to aid the 3D printing process. The core particles of layer 1702 may be a metal, a ceramic, or ceramic microballoons, depending on desired performance of layer 1702. In some embodiments, the reaction rate of layer 1702 with water 1710 may be increased by increases the temperature of water 1710 or by the addition of salt (e.g., about 0.1 wt. % or more salt) to water 1710. Layer 1702 may dissolve away over a period of time depending on the environment and the specific coatings on the core particle. For example, layer 1702 may dissolve in a time frame ranging from 2 to 24 hours. After dissolution of layer 1702, build plate 1700 and article 1750 are separate. Build plate 1700 may then be cleaned and re-used in another AM build process.

While layer 1702 is described as "a layer", layer 1702 may be a multilayer laminate of multiple sublayers. In some such embodiments, adjacent sublayers exhibit galvanic potential. In other embodiments, one or more sublayers include a reactive component as disclosed herein, one or more sublayers include a non-reactive component as disclosed herein, or combinations thereof. In some such embodiments, one or more sublayers include a bulk composition, as disclosed herein.

In some embodiments, when layer 1702 includes multiple sublayers that exhibit galvanic potential relative to one another, layer 1702 is applied to build plate 1700 via a process that does not melt the layer, as melting may, in some embodiments, result in loss of galvanic potentials (e.g., due to the creation of a mixture or alloy of adjacent layers during melting). Some such processes for applying layer 1702 include cold spray and friction stir welding processes, when layer 1702 is composed at least partially of galvanic materials. In such embodiments, sublayers of layer 1702 react via galvanic reaction when in contact with water that contains electrolytes. In other embodiments, layer 1702 is applied via a process in which layer 1702 or portions thereof may at least partially melt, such as thermal spraying or other methods that include melting.

Figure 18A:
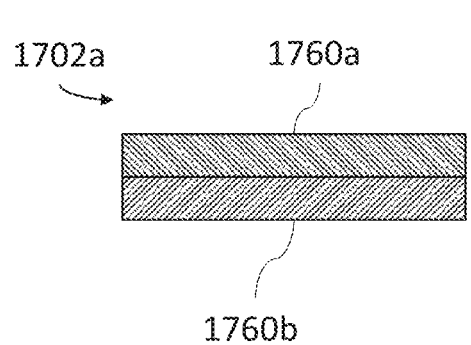
FIGS. 18A and 18B depict two exemplary layers.

In some embodiments, the layer that is formed into and/or used as a substrate to be positioned over a build plate used during additive manufacturing (3D printing) is not composed of the bulk composition disclosed herein. Rather, in some embodiments, the layer is composed of multiple sublayers that exhibit galvanic potential relative to on another. Such layers may be laminated together or otherwise sequentially deposited onto on another, such that one layer is adjacent another layer. FIG. 18A depicts one exemplary layer 1702a that includes sublayers 1760a and 1760b that exhibit galvanic potential relative to one another such that, upon contact with water that contains electrolytes, sublayers 1760a and 1760b galvanically react with one another resulting in the degradation of layer 1702a. While shown as including two layers, such a galvanically reactive layer 1702a may include more than two layers. U.S. patent application Ser. No. 15/464,226 and U.S. patent application Ser. No. 16/385,267 each disclose materials, metals, compositions, and layers that exhibit galvanic potential relative to one another. Any of said materials disclosed in U.S. patent application Ser. No. 15/464,226 and U.S. patent application Ser. No. 16/385,267 may be used herein to form any one or more of the sublayers for use as a substrate layer in additive manufacturing. As would be understood by one skilled in the art, in a galvanic reaction one material acts as the anode, another as the cathode, and another and an electrolyte. In some embodiments of the layers disclosed herein, one sublayer may function as the anode, one sublayer may function as the cathode, and the electrolyte may be a component of the water. Anode materials include nay be a material, compound, molecule, or element capable of undergoing a galvanic reaction with a cathode material, and may be or include a metal or alloy capable of providing a positive ion. For example, and without limitation, anode material may be or include Mg or an alloy thereof, Al or an alloy thereof, Zn or an alloy thereof, Cu or an alloy thereof, or another metal or alloy capable of providing a positive ion. Cathode materials may be a material, compound, molecule, or element capable of undergoing a galvanic reaction with anode material, and may be or include a metal or alloy capable of providing a negative ion. For example, and without limitation, cathode material may be or include Ni or an alloy thereof, Fe or an alloy thereof, Ti or an alloy thereof, a refractory metal (e.g., W, Ta, Mo) or an alloy thereof, or another metal or alloy capable of providing a negative ion. Electrolytes may be an acid former, or another material capable of forming or providing electrolytes upon contact with certain liquids, such as water. For example, electrolytes may be a salt, such as an alkali metal salt or an alkaline earth metal salt. In some aspects, electrolytes may be a chloride, an oxide, or a nitride. For example, and without limitation, electrolytes may be NaCl, CaCl, KCl, MgCl, or HCl. Electrolytes may be water-reactive material, such that upon contact with water, electrolytes form or provide electrolytes therein (e.g. via dissolution within the water int ions). In some embodiments, the layers include three layers, including one layer of anode material as disclosed in U.S. patent application Ser. No. 16/385,267, one layer of cathode material as disclosed in U.S. patent application Ser. No. 16/385,267, and one layer of electrolyte material as disclosed in U.S. patent application Ser. No. 16/385,267.

Figure 18B:
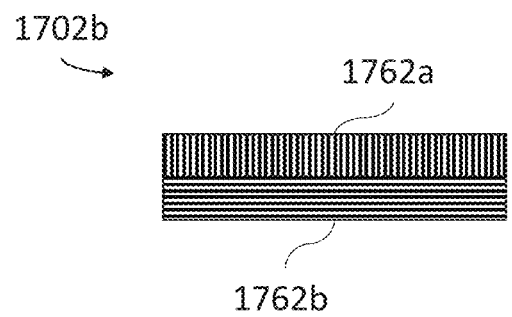

FIG. 18B depicts one exemplary layer 1702b that includes sublayers 1762a and 1762b that do not exhibit galvanic potential relative to one another such that, upon contact with water, sublayers 1762a and 1762b do not galvanically react with one another. Rather, sublayers 1762a and 1762b include a bulk composition (e.g., bulk composition 200) in accordance with the present disclosure and react via displacement reaction with water, acid or base, resulting in the degradation of layer 1702b. While shown as including two layers, such a layer 1702b may include only one layer or more than two layers.

EMBODIMENTS

Certain, non-limiting, embodiments will now be described.

One embodiment of the present disclosure provides a core-shell particle, including a core particle at least partially composed of a non-reactive component; and a coating layer disposed about the core particle. The coating layer is at least partially composed of reactive component. The reactive component is chemically reactive with water, acid, or base. The non-reactive component is substantially non-reactive with water, acid, or base.

Some embodiments of the present disclosure provide a core-shell particle or group of layered particles that function as inner or outer layers. Such embodiments may include a core particle composed of lower reactive composition, and a coating layer disposed about the core particle. The coating layer or core particle may include a reactive material that is reactive in a desired application environment (e.g., in a downhole environment). The coating layer forms a metal binder or matrix of a bulk composition, and reacts in solution in the desired application environment. The time of reaction is determined, at least in part, by the composition of the outer layer, the thickness of the outer layer, the reactivity of the outer layer in the solution, and other factors. For example, in one exemplary case, the reactive component is chemically reactive directly with water, acid, or a base or the environmental fluid. A lower reactive or component follows a substantially slow reaction in the environment, providing the structure of the component during degradation thereof. Removal of the faster dissolving matrix material enables the disintegration of the bulk composition to occur via a controlled reaction. Thus, as the matrix material reacts, the non-reactive core particles fall to the bottom of the solution as a powder.

Another embodiment of the present disclosure provides a method of forming the core-shell particle. The method includes depositing the reactive component onto the non-reactive component. In some embodiments, the depositing includes chemical vapor deposition, atomic layer deposition, plating, electroless plating, or another method of depositing the reactive component onto the non-reactive component.

Another embodiment of the present disclosure provides a bulk composition composed at least partially of the core-shell particle. The bulk composition has a multiphase morphology, including particles of the non-reactive component distributed within a matrix material composed at least partially of the reactive component.

Another embodiment of the present disclosure provides a method of making the bulk composition, including consolidating the core-shell particles into the bulk composition having a consolidated shape. The consolidating includes solid-state processing the core-shell particles.

Another embodiment of the present disclosure provides an article of manufacture composed at least partially of the bulk composition. The article may be a downhole tool or component, a terrestrial or aerial vehicle, an electronic component, or a medical component.

Another embodiment of the present disclosure provides a method of manufacturing the article, including solid-state processing the bulk composition into the article.

Another embodiment of the present disclosure provides a system for making the core-shell particle, bulk composition, and/or article, the system including a fluidized bed reactor and a solid-state processing apparatus.

Another embodiment of the present disclosure provides a method of hydraulic fracturing. The method includes providing frac balls downhole that are composed of the bulk composition, and at least partially fluidically blocking perforations in the wellbore downhole with the frac balls. Upon contact with the liquid downhole, the reactive component begins to react with the liquid.

Another embodiment of the present disclosure provides a method of using a drone composed of the bulk composition. The method includes flying the drone to a desired location; flying the drone into water; and allowing the drone to dissolve or degrade in the water. Upon contact with the water, the reactive component begins to react with the water, or with acid in the water, or with base in the water.

Embodiment 1. A core-shell particle comprising: a core particle composed of a non-reactive component; and a coating layer disposed about the core particle, the coating layer composed of reactive component; wherein the reactive component is chemically reactive with water, acid, or base, and wherein the non-reactive component is substantially non-reactive with water, acid, or base.

Embodiment 2. The core-shell particle of embodiment 1, wherein the reactive component reacts with water, acid, or base via a displacement reaction.

Embodiment 3. The core-shell particle of embodiment 1 or 2, wherein the reactive component is a metal, metal alloy, or ceramic.

Embodiment 4. The core-shell particle of any of embodiments 1 to 3, wherein the reactive component comprises Cu, Ni, Al, K, Na, Ca, Ti, V, Mg, graphite, Fe, Li, W, or Mo.

Embodiment 5. The core-shell particle of any of embodiments 1 to 4, wherein the non-reactive component is a metal, metal alloy, ceramic, carbide, oxide, nitride, or polymer.

Embodiment 6. The core-shell particle of any of embodiments 1 to 5, wherein the non-reactive component is a Nickel Chrome alloy; Titanium or an alloy thereof; Tantalum or an alloy thereof; Tungsten or an alloy thereof; a carbide; iron or an alloy thereof; or steel.

Embodiment 7. The core-shell particle of any of embodiments 1 to 6, wherein the non-reactive component is in the form of a particulate or powder, and wherein the reactive component is in the form of a coating layer disposed about the non-reactive component.

Embodiment 8. The core-shell particle of any of embodiments 1 to 7, wherein the core-shell particle includes only a single coating layer.

Embodiment 9. The core-shell particle of any of embodiments 1 to 7, wherein the core-shell particle includes multiple coating layers.

Embodiment 10. The core-shell particle of embodiment 9, wherein each coating layer of the multilayer core-shell particle is of the same composition.

Embodiment 11. The core-shell particle of embodiment 9, wherein each coating layer of the multilayer core-shell particle is of a different composition.

Embodiment 12. The core-shell particle of embodiment 9, wherein each coating layer of the multilayer core-shell particle is the same as adjacent coating layers of the multilayer core-shell particle.

Embodiment 13. The core-shell particle of any of embodiments 1 to 12, wherein the reactive component and the non-reactive component are not galvanically reactive with each other.

Embodiment 14. The core-shell particle of any of embodiments 1 to 13, wherein the core-shell particle includes a nickel-chromium alloy core particle coated with a layer of nickel.

Embodiment 15. The core-shell particle of embodiment 14, wherein the core-shell particle includes a layer of nickel-chrome alloy coated about the layer of nickel.

Embodiment 16. A method of forming a core-shell particle in accordance with any of embodiments 1 to 15, the method comprising: depositing the reactive component onto the non-reactive component.

Embodiment 17. The method of embodiment 16, wherein the depositing includes chemical vapor deposition, atomic layer deposition, plating, or electroless plating of the reactive component onto the non-reactive component.

Embodiment 18. The method of embodiment 16, wherein the method includes introducing the non-reactive component, and the reactive component or a precursor thereof into a reactor prior to the depositing.

Embodiment 19. The method of embodiment 18, wherein the reactor is a fluidized bed reactor.

Embodiment 20. The method of embodiment 18 or 19, wherein the reactor is maintained at conditions suitable for chemical vapor deposition, atomic layer deposition, plating, or electroless plating of the reactive component onto the non-reactive component.

Embodiment 21. A bulk composition comprising formed from the core-shell particle of any of embodiments 1 to 15.

Embodiment 22. The bulk composition of embodiment 21, wherein the bulk composition has a multiphase morphology including particles of the non-reactive component distributed within a matrix material, wherein the matrix material is composed of the reactive component.

Embodiment 23. The bulk composition of embodiment 22, wherein the particles of the non-reactive component are embedded and distributed within the matrix material.

Embodiment 24. The bulk composition of embodiment 22 or 23, wherein the matrix material forms a continuous phase of the bulk composition, and the particles of the non-reactive component forms a discontinuous phase of the bulk composition.

Embodiment 25. The bulk composition of any of embodiments 22 to 23, wherein the bulk composition includes multiple different core particles composed of different non-reactive components.

Embodiment 26. A method of making the bulk composition of any of embodiments 21 to 25, the method comprising: consolidating the core-shell particles into the bulk composition having a consolidated shape.

Embodiment 27. The method of embodiment 26, wherein the consolidating includes solid-state processing the core-shell particles.

Embodiment 28. The method of embodiment 26 or 27, wherein the consolidating includes forging, casting, extruding, additive manufacturing, or spark plasma sintering (SPS) the core-shell particles.

Embodiment 29. An article of manufacture composed of the bulk composition of any of embodiments 21 to 25.

Embodiment 30. The article of embodiment 29, wherein the article is a downhole tools and component, a terrestrial or aerial vehicle, an electronic component, or a medical component.

Embodiment 31. The article of embodiment 29 or 30, wherein the article is a frac ball, frac plus, piping, tubing, or drone.

Embodiment 32. A method of manufacturing an article in accordance with any of embodiments 29 to 31, the method comprising solid-state processing the bulk composition into the article.

Embodiment 33. The method of embodiment 32, wherein the solid-state processing includes forging, casting, extruding, additive manufacturing, or spark plasma sintering (SPS) the bulk composition.

Embodiment 34. The article of any of embodiments 29 to 31, wherein dissolution or degradation of the article is selectively controlled via: the number of coating layers about the core particle; for multiple layers, the order in layer creation and the thickness of each coating layer; the composition of each coating layer; the weight percentage of the core particle and each coating layer, based on the total weight of the core-shell particle; the arrangement of the coating layer(s); or combinations thereof.

Embodiment 35. The article of embodiment 34, wherein the article is designed and controlled to dissolve or degrade within a selected period of time.

Embodiment 36. The article of embodiment 34 or 35, wherein the coating layer(s) of the reactive component are selected and arranged to provide a desired residence time of the article within water prior to dissolution or degradation of the article, and wherein the core particle is selected to provide a desired strength to the article.

Embodiment 37. A system for making a core-shell particle in accordance with any of embodiments 1 to 15.

Embodiment 38. The system of embodiment 37, wherein the system includes a fluidized bed reactor configured for chemical vapor deposition, atomic layer deposition, plating, or electroless plating.

Embodiment 39. The system of embodiment 37 or 38, wherein the system is further configured to make the bulk composition in accordance with any of embodiments 21 to 25 or the article in accordance with any of embodiments 29 to 31 and 34 to 36, the system further comprising a solid-state processing apparatus.

Embodiment 40. A method of hydraulic fracturing, the method comprising: providing frac balls downhole, wherein the frac balls are composed of the bulk composition in accordance with any of embodiments 21 to 25; at least partially fluidically blocking perforations in the wellbore downhole with the frac balls; wherein, upon contact with the liquid downhole, the reactive component begins to react with the liquid, wherein the liquid includes water.

Embodiment 41. The method of embodiment 40, wherein the liquid contains an acid.

Embodiment 42. The method of embodiment 40, wherein the liquid contains a base.

Embodiment 43. A method of using a drone composed of the bulk composition in accordance with any of embodiments 21 to 25, the method comprising: flying the drone to flown to a desired location; flying the drone into water or other reactive liquid or gas; and allowing the drone to dissolve or degrade in the water (or reactive liquid/gas), wherein, upon contact with the water, the reactive component begins to react with the water, or with acid in the water, or with base in the water.

Embodiment 44. A core-shell particle comprising: a core particle including a non-reactive component; and a layer disposed about the core particle, the layer including a reactive component; wherein the reactive component is chemically reactive with water, acid, or base, and wherein the non-reactive component is not reactive with water, acid, or base.

Embodiment 45. The core-shell particle of embodiment 44, wherein the reactive component reacts with water, acid, or base via a displacement reaction.

Embodiment 46. The core-shell particle of embodiment 44 or 45, wherein the reactive component is a metal, metal alloy, metal oxide, or ceramic.

Embodiment 47. The core-shell particle of any of embodiments 44 to 46, wherein the reactive component comprises Cu, Ni, Al, K, Na, Ca, Ti, V, Mg, graphite, Fe, Li, W, or Mo.

Embodiment 48. The core-shell particle of any of embodiments 44 to 47, wherein the non-reactive component is a metal, metal alloy, ceramic, carbide, oxide, nitride, or polymer.

Embodiment 49. The core-shell particle of any of embodiments 44 to 48, wherein the non-reactive component is a Nickel Chrome alloy; Titanium or an alloy thereof; Tantalum or an alloy thereof; Tungsten or an alloy thereof; a carbide; or iron or an alloy thereof.

Embodiment 50. The core-shell particle of any of embodiments 44 to 49, wherein the reactive component and the non-reactive component are not galvanically reactive with each other.

Embodiment 51. The core-shell particle of any of embodiments 44 to 50, wherein the core particle includes a nickel-chromium alloy, and wherein the layer includes nickel.

Embodiment 52. The core-shell particle of embodiment 51, further comprising a second layer of nickel-chrome alloy disposed about the layer that includes nickel.

Embodiment 53. The core-shell particle of any of embodiments 44 to 52, wherein the non-reactive component is a microballoon.

Embodiment 54. The core-shell particle of any of embodiments 44 to 53, further comprising a reaction inhibitor, wherein the reaction inhibitor is within the layer or is in a second layer disposed about the core particle.

Embodiment 55. The core-shell particle of embodiment 54, wherein the reaction inhibit comprises Ta or Ni—Cr.

Embodiment 56. A bulk composition having a multiphase morphology, the bulk composition comprising: a continuous phase of a matrix material comprising a reactive component; and a discontinuous phase including a plurality of particles of a non-reactive component; wherein the plurality of particles are distributed within the matrix material; and wherein the reactive component is chemically reactive with water, acid, or base, and wherein the non-reactive component is not reactive with water, acid, or base.

Embodiment 57. The bulk composition of embodiment 56, wherein the plurality of particles comprise multiple different non-reactive components.

Embodiment 58. An article of manufacture comprising: a bulk composition having a multiphase morphology, the bulk composition comprising: a continuous phase of a matrix material comprising a reactive component; and a discontinuous phase including a plurality of particles of a non-reactive component; wherein the plurality of particles are distributed within the matrix material; and wherein the reactive component is chemically reactive with water, acid, or base, and wherein the non-reactive component is not reactive with water, acid, or base.

Embodiment 59. The article of manufacture of embodiment 58, wherein the article is a downhole tool or component, a terrestrial or aerial vehicle, an electronic component, a bullet, a billet, or a medical component.

Embodiment 60. The article of manufacture of embodiment 58 or 59, wherein a first portion of the article includes the bulk composition, and wherein a second portion of the article includes a second bulk composition, wherein the second bulk composition is different than the first bulk composition, the second bulk composition having a multiphase morphology, the second bulk composition comprising a continuous phase of a matrix material comprising a reactive component; and a discontinuous phase including a plurality of particles of a non-reactive component; wherein the plurality of particles are distributed within the matrix material; and wherein the reactive component is chemically reactive with water, acid, or base, and wherein the non-reactive component is unreactive with water, acid, or base.

Embodiment 61. A method comprising: depositing a reactive component onto a plurality of core particles of a non-reactive component; wherein the deposited reactive component forms layers about the plurality of core particles, thereby forming a plurality of core-shell particles; wherein the reactive component is chemically reactive with water, acid, or base, and wherein the non-reactive component is not reactive with water, acid, or base.

Embodiment 62. The method of embodiment 61, wherein the depositing includes chemical vapor deposition, atomic layer deposition, plating, or electroless plating of the reactive component onto the plurality of core particles.

Embodiment 63. The method of embodiment 61, further comprising consolidating the plurality of core-shell particles into a bulk composition or an article.

Embodiment 64. The method of claim 63, wherein the consolidating includes solid-state processing the plurality of core-shell particles.

Embodiment 65. The method of embodiment 64, wherein the consolidating includes forging, casting, extruding, additive manufacturing, or spark plasma sintering (SPS) the plurality of core-shell particles.

Embodiment 66. A method of using an article, the method comprising: providing an article comprising a bulk composition having a multiphase morphology, the bulk composition comprising a continuous phase of a matrix material comprising a reactive component; and a discontinuous phase including a plurality of particles of a non-reactive component; wherein the plurality of particles are distributed within the matrix material; and wherein the reactive component is chemically reactive with water, acid, or base, and wherein the non-reactive component is not reactive with water, acid, or base; and contacting the article with water, acid, or base; wherein, upon or after contact with water, acid, or base, the reactive component reacts with the water, acid, or base.

Embodiment 67. The method of embodiment 66, wherein the method includes hydraulically fracturing a wellbore, wherein the article is a frac ball, and wherein the providing includes providing the frac ball downhole, the method comprising: at least partially fluidically blocking perforations in the wellbore with the frac ball; and wherein the contacting of the article with water, acid, or base includes contacting the frac ball with water, acid, or base that is located downhole.

Embodiment 68. The method of claim 66, wherein the article is a drone, the method comprising: flying or driving the drone to a desired location; and wherein contacting the article with water, acid or base includes flying or driving the drone into the water, acid, or base.

Embodiment 69. A method of making an article, the method comprising: consolidating a first plurality of core-shell particles to form at least a first portion of an article, wherein the first plurality of core-shell particles comprise core-shell particles that include a core particle including a non-reactive component; and a layer disposed about the core particle, the layer including a reactive component; wherein the reactive component is chemically reactive with water, acid, or base, and wherein the non-reactive component is unreactive with water, acid, or base.

Embodiment 70. The method of embodiment 69, further comprising consolidating a second plurality of core-shell particles to form at least a second portion of the article, wherein the second plurality of core-shell particles comprise core-shell particles that include a core particle including a non-reactive component; and a layer disposed about the core particle, the layer including a reactive component; wherein the reactive component is chemically reactive with water, acid, or base, and wherein the non-reactive component is unreactive with water, acid, or base.

Embodiment 71. The method of embodiment 70, wherein the first and second bulk compositions exhibit different reaction rates in the presence of water, acid, or base.

Embodiment 72. A method of additive manufacturing an article, the method comprising: depositing a layer onto a build plate; additive manufacturing an article from a material onto the layer, such that the layer is positioned between the material and the build plate; after additive manufacturing of the article, contacting the layer with water until the layer dissolves, such that the article is separated from the build plate and the layer; and retrieving the article.

Embodiment 73. The method of embodiment 72, wherein the layer comprises a bulk composition having a multiphase morphology, the bulk composition comprising a continuous phase of a matrix material comprising a reactive component; and a discontinuous phase including a plurality of particles of a non-reactive component; wherein the plurality of particles are distributed within the matrix material; and wherein the reactive component is chemically reactive with water, acid, or base, and wherein the non-reactive component is unreactive with water, acid, or base.

Embodiment 74. The method of embodiment 72, wherein the layer comprises at least two sublayers, wherein the at least two sublayers exhibit a galvanic potential relative to one another, and wherein the at least two sublayers react with one another in a galvanic reaction upon contact with the water, wherein the water contains an electrolyte.

Embodiment 75. The method of any of embodiments 72 to 74, wherein depositing the layer on the build plate includes additive manufacturing the layer onto the build plate.

Embodiment 76. The method of any of embodiments 72 to 75, wherein depositing the layer on the build plate includes positioning a pre-formed layer onto the build plate.

Embodiment 77. The method of any of embodiments 72 to 76, wherein contacting the layer with water includes submerging a unitary structure of the article, the layer, and the build plate within the water.

Embodiment 78. The method of any of embodiments 72 to 77, wherein upon contact with water, the layer reacts with the water and dissolves.

Embodiment 79. The method of any of embodiments 72 to 78, wherein the article is retrieved from the build plate without use of machining.

Embodiment 80. The method of any of embodiments 72 to 79, wherein the layer is cold sprayed or friction stir welded onto build plate.

Embodiment 81. The method of any of embodiments 72 to 80, wherein the layer dissolves within a time ranging from 2 to 24 hours.

Embodiment 82. The method of any of embodiments 72 to 81, further comprising cleaning the build plate and re-using the build plate in additive manufacturing another article.

Embodiment 83. The method of any of embodiments 72, 73 and 75 to 82, wherein the layer is thermal sprayed onto the build plate.

Embodiment 84. The method of any of embodiments 72 to 83, wherein the layer is a multilayer laminate comprising at least two sublayers laminated together.

Although the present embodiments and advantages have been described in detail, it should be understood that various changes, substitutions and alterations can be made herein without departing from the spirit and scope of the disclosure. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A bulk composition having a multiphase morphology, the bulk composition comprising:
   a dissolvable continuous phase of a matrix material comprising a reactive component that is chemically reactive with neutral water, acidic water, or basic water via a chemical displacement reaction; and
   a non-dissolvable discontinuous phase including a plurality of particles of a non-reactive component that are chemically unreactive with neutral water, acidic water, or basic water via a chemical displacement reaction;
   wherein the plurality of particles are distributed within the matrix material;
   wherein the reactive component and the non-reactive component are not galvanically reactive with each other;
   wherein the matrix material is from 1 to 25 wt. % of the bulk composition, based on a total weight of the bulk composition; and
   wherein the reactive component comprises graphite, K, Na, V, Li, W, Mo, $Al_4C_3$, AlP, Ba, $BaH_2$, BaSe, $BaSi_2$, BP, $CaC_3$, $CaH_2$, $Ca_2P_2$, $CaSi_2$, $CaC_2$, $Mg_2Si$, SiS, or $ZrCl_3$.

2. The bulk composition of claim 1, wherein the reactive component reacts with water via a displacement reaction.

3. The bulk composition of claim 1, wherein the reactive component is graphite.

4. The bulk composition of claim 1, wherein the reactive component is a metal that comprises K, Na, V, Li, W, or Mo.

5. The bulk composition of claim 1, wherein the non-reactive component is a ceramic, oxide, nitride, or polymer.

6. The bulk composition of claim 1, wherein the non-reactive component is a microballoon.

7. The bulk composition of claim 1, wherein the non-reactive component is a Titanium or an alloy thereof; Tantalum or an alloy thereof; or iron or an alloy thereof.

8. The bulk composition of claim 1, wherein the non-reactive component is a Nickel-Chromium alloy.

9. The bulk composition of claim 1, wherein the reactive component comprises $Al_4C_3$, AlP, Ba, $BaH_2$, BaSe, $BaSi_2$, BP, $CaC_3$, $CaH_2$, $Ca_2P_2$, $CaSi_2$, $CaC_2$, $Mg_2Si$, SiS, or $ZrCl_3$.

10. The bulk composition of claim 1, wherein the bulk composition comprises from 1 to 25 wt. % of the reactive component, based on the total weight of the bulk composition, and wherein the bulk composition comprises from 75 to 99 wt. % of the non-reactive component based on the total weight of the bulk composition.

11. An article of manufacture comprising:
    a bulk composition having a multiphase morphology, the bulk composition including a continuous phase of a matrix material comprising a reactive component that is chemically reactive with neutral water, acidic water, or basic water via a chemical displacement reaction; and a discontinuous phase including a plurality of particles of a non-reactive component that are chemically unreactive with neutral water, acidic water, or basic water via a chemical displacement reaction; wherein the plurality of particles are distributed within the matrix material; wherein the reactive component and the non-reactive component are not galvanically reactive with each other, wherein the matrix material is from 1 to 25 wt. % of the bulk composition, based on a total weight of the bulk composition, and wherein the reactive component comprises graphite, K, Na, V, Li, W, Mo, $Al_4C_3$, AlP, Ba, $BaH_2$, BaSe, $BaSi_2$, BP, $CaC_3$, $CaH_2$, $Ca_2P_2$, $CaSi_2$, $CaC_2$, $Mg_2Si$, SiS, or $ZrCl_3$.

12. The bulk composition of claim 1, wherein the reactive component is not galvanically reactive with water, acid, or base.

13. The bulk composition of claim 1, wherein the non-reactive component comprises Mg.

14. The article of manufacture of claim 11, wherein the article is a downhole tool or component.

15. The article of manufacture of claim 11, wherein a first portion of the article includes the bulk composition, and wherein a second portion of the article includes a second bulk composition, wherein the second bulk composition is different than the bulk composition, the second bulk composition having a multiphase morphology, the second bulk composition comprising a continuous phase of a matrix material comprising a reactive component; and a discontinuous phase including a plurality of particles of a non-reactive component; wherein the plurality of particles are distributed within the matrix material; and wherein the reactive component is chemically reactive with neutral water, acidic water, or basic water via a chemical displacement reaction, and the non-reactive component is chemically unreactive with neutral water, acidic water, or basic water via a chemical displacement reaction.

16. The article of manufacture of claim 11, further comprising a substrate layer positioned between a build plate and an additively manufactured article, the substrate layer including at least one layer of the bulk composition.

17. The bulk composition of claim 1, wherein the reactive component reacts with a base via a displacement reaction.

18. The bulk composition of claim 1, wherein the reactive component reacts with an acid via a displacement reaction.

19. The article of manufacture of claim 11, wherein the article is a terrestrial or aerial vehicle, an electronic component, a bullet, a billet, or a medical component.

\* \* \* \* \*